US009342984B2

(12) United States Patent
Bortolotto

(10) Patent No.: US 9,342,984 B2
(45) Date of Patent: May 17, 2016

(54) SYSTEM AND METHOD FOR MONITORING AND CAPTURING POTENTIAL TRAFFIC INFRACTIONS

(76) Inventor: Persio Walter Bortolotto, Maringá, PR (US)

( * ) Notice: Subject to any disclaimer, the term of this patent is extended or adjusted under 35 U.S.C. 154(b) by 628 days.

(21) Appl. No.: 12/593,994

(22) PCT Filed: Mar. 28, 2008

(86) PCT No.: PCT/BR2008/000090
§ 371 (c)(1),
(2), (4) Date: Mar. 18, 2010

(87) PCT Pub. No.: WO2008/119145
PCT Pub. Date: Oct. 9, 2008

(65) Prior Publication Data

US 2011/0128376 A1 Jun. 2, 2011

(30) Foreign Application Priority Data

Mar. 30, 2007 (BR) ...................................... 0701733

(51) Int. Cl.
*H04N 7/18* (2006.01)
*G08G 1/017* (2006.01)
*G08G 1/054* (2006.01)

(52) U.S. Cl.
CPC .............. *G08G 1/0175* (2013.01); *G08G 1/054* (2013.01)

(58) Field of Classification Search
CPC .................................................... G08G 1/0175
USPC .......... 340/905, 907, 933, 936, 937; 348/149; 701/1, 117, 301, 70; 703/8
See application file for complete search history.

(56) References Cited

U.S. PATENT DOCUMENTS

| | | | | |
|---|---|---|---|---|
| 3,436,540 | A * | 4/1969 | Lamorlette | 250/338.1 |
| 5,734,337 | A * | 3/1998 | Kupersmit | 340/937 |
| 5,935,190 | A * | 8/1999 | Davis et al. | 701/119 |
| 6,281,808 | B1 * | 8/2001 | Glier et al. | 340/933 |
| 6,466,260 | B1 * | 10/2002 | Hatae et al. | 348/149 |
| 6,573,929 | B1 * | 6/2003 | Glier et al. | 348/149 |

(Continued)

FOREIGN PATENT DOCUMENTS

| | | |
|---|---|---|
| BR | 0102542-2 | 1/2003 |
| DE | 195 17 536 | 11/1996 |

(Continued)

OTHER PUBLICATIONS

International Search Report and Written Opinion of corresponding international application No. PCT/BR2008/000090, mailed Oct. 24, 2008.

(Continued)

*Primary Examiner* — Christopher S Kelley
*Assistant Examiner* — Jonathan Messmore
(74) *Attorney, Agent, or Firm* — Alston & Bird LLP

(57) ABSTRACT

The present invention refers to a system and method for monitoring and supervising potential traffic infractions, comprising the detection of potential traffic infractions and the capture of the images thereof, wherein the images preferentially relate to a sequence of images of the pre and post events, further comprising a multi-thread module which enables the capture of images of one or more potential traffic infractions occurring in the same or in different lanes of the road, with almost simultaneous pre-event and post-event sequences.

33 Claims, 30 Drawing Sheets

A

B

(56) References Cited

U.S. PATENT DOCUMENTS

| | | | | |
|---|---|---|---|---|
| 6,647,361 | B1 * | 11/2003 | Laird et al. | 703/8 |
| 6,760,061 | B1 * | 7/2004 | Glier et al. | 348/149 |
| 6,950,789 | B2 * | 9/2005 | Laird et al. | 703/8 |
| 7,088,387 | B1 * | 8/2006 | Freeman et al. | 348/155 |
| 7,433,764 | B2 * | 10/2008 | Janssen | 701/1 |
| 7,986,339 | B2 * | 7/2011 | Higgins | 348/149 |
| 2002/0054210 | A1 * | 5/2002 | Glier et al. | 348/149 |
| 2004/0054513 | A1 * | 3/2004 | Laird et al. | 703/8 |
| 2004/0252193 | A1 * | 12/2004 | Higgins | 348/149 |
| 2005/0073434 | A1 * | 4/2005 | Arquette et al. | 340/907 |
| 2005/0151671 | A1 * | 7/2005 | Bortolotto | 340/936 |
| 2006/0095199 | A1 * | 5/2006 | Lagassey | 701/117 |
| 2007/0021915 | A1 * | 1/2007 | Breed et al. | 701/301 |
| 2007/0220357 | A1 * | 9/2007 | Vedanabhatla et al. | 714/43 |
| 2009/0048750 | A1 * | 2/2009 | Breed | 701/70 |
| 2009/0119481 | A1 * | 5/2009 | Vishkin | 712/29 |
| 2011/0133952 | A1 * | 6/2011 | McNamara et al. | 340/905 |
| 2011/0182473 | A1 * | 7/2011 | Wang | 382/103 |

FOREIGN PATENT DOCUMENTS

| | | | |
|---|---|---|---|
| DE | 19517536 | A1 * | 11/1996 |
| EP | 0 621 572 | | 10/1994 |
| GB | 2246654 | A * | 2/1992 |
| WO | WO 01/20581 | | 3/2001 |

OTHER PUBLICATIONS

International Preliminary Report on Patentability of corresponding application No. PCT/BR2008/000090 mailed Jul. 7, 2009.

* cited by examiner

SYSTEM AND METHOD FOR MONITORING AND CAPTURING POTENTIAL TRAFFIC INFRACTIONS

CROSS REFERENCE TO RELATED APPLICATIONS

This application is a national stage application, filed under 35 U.S.C. §371, of International Application No. PCT/BR2008/000090, filed Mar. 28, 2008, which claims priority to Brazilian Patent Application No. PI0701733-2, filed Mar. 30, 2007, the contents of both which are hereby incorporated by reference in their entirety.

BACKGROUND

The present invention refers to a system and method for monitoring and supervising potential traffic infractions, representing a substantial improvement over the teachings of Brazilian patent application No. PI 0102542-2 filed on Apr. 4, 2001. PI 0102542-2 discloses among other characteristics, the recording and storage of pre- and post-events of possible traffic infractions, for the purpose of enabling the analysis of events occurring before, during and after the actual event, by personnel in charge of such analysis, with the possibility of unlimited repetitions of the recorded event, such that actions relative to infractions and the registration thereof or opinions regarding the same may be realized without leaving margin for doubt, and wherein together with the registration actions, this system and method may further drive panels for provision of information on the weather, and may further transmit identification data relative to vehicles passing by the location where the system and method is installed, via wireless radio transmission or other forms of communication, to a central facility where the control of these vehicles is performed.

Therefore, the present invention is comprised by a set of modules, and may be used concurrently as a system and method for monitoring and supervising purposes, by means of dynamic imaging, with several frames of a possible infraction, with pre- and post-events, or may be used separately as a system and method for monitoring and supervising by means of still images, with one to three frames of the possible infraction. This system and method is preferably applied to vehicles, vehicle fleets, traffic monitoring and supervision, and further comprises the object of educating and enhancing the safety of the elements that integrate the roadway system, including drivers and pedestrians.

One situation that was left without solution in the prior art system and method for capture and storage of dynamic images consisted in the fact that, upon there being ascertained a possible infraction in one of the traffic lanes, the equipment started the capture of an event, however, some thousandths of a second after the start of capture of such possible infraction, there might be ascertained again, in the same traffic lane or in another lane, one further possible infraction. How could the capture of the pre-event of these two almost simultaneous events be performed, as such events were spaced but a few thousandths of a second from one another? Among the possible forms of execution of the task of this module, there will be described a few methods.

BRIEF SUMMARY

The first manner of execution of the method occurs with the preventive formation of several simultaneous image capture threads, however with an offset of one frame between each of those that will be used as the pre-event for each of the possible infractions. When the system and method is activated, it creates as many capture threads as may be necessary until fulfilling the total period of the pre-event, and subsequently it discards the thread that exceeds such period, but simultaneously it creates a new thread to replace that which was discarded, thereby always keeping the same number of threads corresponding to the number of frames previously determined for the pre-event. The new system and method creates a circular buffer of threads and sequentially discards those that exceeded their time limit. Therefore, if several vehicles commit possible infractions, one after the other, even with differences in the order of thousandths of a second between one another, each of such possible offenders will have warranted its pre-event with the previously programmed total number of frames.

In the second manner of execution, when the new system and method is activated, it creates as many threads as may be required until fulfilling the total time of the pre-event, and subsequently each thread operates with a circular buffer memory discarding the oldest frame of each thread every time that a new frame is added to each thread. When an event is triggered, it uses a thread that is complete, and simultaneously there is created a new thread to replace that which has been used, thereby always maintaining the same number of threads, and there existing as many threads as the number of frames previously determined for the pre-event. Therefore, if several vehicles commit possible infractions, one after the other, even if with a difference in time of only a few thousandths of a second between each one, each of these possible offenders will have warranted its pre-event with the previously programmed total number of frames.

The third manner of execution occurs with the generation of the pre-event image frames in a circular buffer as described in patent application No. PI 0102542-2 wherein, upon each new frame being added to the loop memory, an older frame is discarded, and upon the occurrence of infractions, such infractions being spaced from one another in time by only a few thousandths of a second, in the new system and method there are created backup threads, one such backup thread being created for each infraction, and the pre-event of each of these infractions is formed from a copy of the images of pre-event existing at that time in the said circular buffer, and in real time each backup thread acquires the necessary images for their post-events. Therefore, if several vehicles commit possible infractions one after the other, even if with a difference in time of only a few thousandths of a second, each of such possible offenders will have warranted its pre-event with the previously programmed total number of frames.

We should not mistake this characteristic for that which is present in the instant applicant's patent application No. PI 0102542-2 wherein is made the following statement: "Since the system is executed in a multitasking and multithreading operating system, the initialization will run the modules in parallel, in accordance with the specifications set in the configuration file". The multi-tasks or multi-threads disclosed in the said document refer to the ability of the operating system to run several modules in parallel as described in patent application No. PI 0102542-2, to wit: speed measurement simultaneously with checking whether a red light was advanced, simultaneously with the readout of the characters of a license plate and/or the control of the color modes of a semaphore (i.e., a traffic signal). Differently therefrom, the multi-tasks or multi-threads disclosed herein relatively to the "new system and method . . . ", relate to the simultaneous recording of several possible infractions with complete and up-to-date pre-events.

Having in view the necessity of recording with due precision everything that occurs in some locations of the public roads, during the day as well as during the night, the system and method of the present invention acquire and store permanently, in a separate location, the images obtained during the twenty-four hours of the day of the supervised location, at a programmable rate of as many frames per second as may be desired and with storage space for at least one month of continuous recording at a high number of frames per second. There has been implemented a method that computes the average of the utilized spaces during each day of capture and automatically manages the total available amount of storage space. When this space decreases to less than the value required to store three days' worth of images, the images of the two oldest days in storage are erased, always opening up space to store images of the most recent day. With the currently unceasing increase of storage space availability, it will be possible, in a very near future, to only erase images after one year or more of storage. Instead of being simply erased, the images relative to the oldest days may be transferred to a central storage and analysis facility, via wireless transmission or otherwise. The question of storage being thus answered, the present applicant adds thereto a method that depicts, in the acquired images, a chronometer marking minutes, seconds and thousandths of seconds and which starts from zero every time that the supervised approach to the semaphore turns to the green color. An identical procedure also takes place when the supervised approach to the semaphore turns to the yellow color. With the semaphore in the red color, when the same is turned on, there is already provided a chronometer with tenths of a second in all the frames.

One example of application is the case of a vehicle entering the supervised crossing with green light in the semaphore and colliding with another vehicle that is advancing the signal transversally ignoring the red light in the semaphore, where the crossing is not provided with supervision equipment in that direction of approach. The existing equipment as well as the "System and Method for Capture-Storage of Events" will not acquire the images of the vehicle that crossed the physical or virtual detectors with the green light in the semaphore, and if on the day that the accident case is tried the offender that advanced the red light semaphore in the crossing brings false witnesses to affirm that the offender was the one that had the right to proceed since he or she had a green light in the semaphore, there will be no images to bring forth the truth.

However, in the present invention, this characteristic of uninterrupted capture and storage of images in dynamic manner (a movie) of the correct vehicle entering the crossing with a green light in the semaphore and at the moment of collision and afterwards, it will be possible to ascertain at which time (including seconds and thousandths of a second) the correct vehicle entered the green-lighted crossing and based on this time, upon checking the diagram of plans and stages of the local controller, it will be possible to establish with certitude the time when the offender vehicle entered the crossing.

One other example of use of the uninterrupted daily and nightly capture of the present invention is the possibility of capture of events throughout the twenty-four hours of the day, from the images of a location of the road wherein is being supervised excess speed or the use of the exclusive lane for busses or small vehicles. Any accidents occurring in the vicinity of such points will be recorded irrespectively of there having occurred any speed limit infractions or transit in a prohibited lane in such locations.

One other example of use of the uninterrupted daily and nightly capture of the present invention is the possibility of investigating all vehicles that passed by a point near which there occurred a terrorist strike or that has been used as an escape route from a robbery.

One other need that appears at the time of analyzing the images in the existing systems and methods with several images of the pre-event and the post-event is that of enlarging the acquired images while the images are in motion in order to obtain a more precise analysis of the event that took place. In order to render this possible, the present invention discloses a module that provides this functionality in each of the 4 images, while the images are in motion, enlarging the same to allow the observation of details of the images acquired by the camera, thereby increasing the level of precision of image analysis and increasing the yield in number of events analyzed in a given period of time.

One shortcoming of the event capture and storage system and method that provides one to three frames of the possible infraction or with capture of several frames of a possible infraction with pre- and post-event, resides in need to know for how long a vehicle, upon being acquired dynamically or statically in one location, actually remained in that location. The instant applicant has created in the present invention, a method wherein upon capture of a red light advancing event (with pre- and post-event), the method continues, after the completion of capture of the post-event, to perform a reading of the detector until the vehicle leaves the area of influence thereof, and then at the moment when the vehicle leaves the detection area, the method acquires one further event (with pre-event and post-event), irrespective of the time taken by the vehicle to leave the detection area (1 hour or 10 hours, for example), and also irrespective of the semaphore being green, yellow or red. As a practical result of this characteristic, an event will be acquired when the vehicle enters the area of influence of the detector with a red light, and another event will be acquired at the time when the vehicle leaves the area of influence of the detector, that is, we will have the moment when the infraction was committed and the moment when the vehicle left the area where it committed the possible infraction. Presently, using a conventional equipment, it is not possible to know whether the vehicle remained unduly parked during the period of one semaphore cycle (60 seconds), or 24 hours. With this characteristic, it is possible to know, and further inform the Transit Authority Board of Appeals JARI, the actual behavior of the driver.

One other shortcoming present in the event capture and storage system and method that uses one to three frames of the possible infraction or with capture of several frames of a possible infraction with pre- and post-event resides in the need to know what happened after the time when a vehicle was acquired in a detector. In order to be able to perform an analysis, the present invention discloses a method wherein during or after the capture of a red light advancing event, irrespective of the semaphore remaining red or not, if there subsists a presence in the detector, the method starts an internal chronometer and after a predetermined interval of time it triggers the capture of one further event, which may be timed back to the first event, may be spaced from the first by an interval of time, or may be exactly subsequent to one another. With this characteristic, the traffic agent that processes the images will be able to make a prior evaluation and refrain from registering an infraction concerning a vehicle that malfunctioned over the pedestrian crossing strip, since if there are acquired further sequences, the agent will be able to note that the vehicle will, for example, have its engine hood open, and that the stop occurred involuntarily.

In the daily operation with a system and method for static or dynamic capture, with pre-event and post-event, an interesting situation occurs in roadways with several traffic lanes, when a large vehicle such as a bus moves along the lane contiguous to the sidewalk wherein are installed the image capture cameras, and substantially jeopardizes the capture of images of a possible offender vehicle that moves along the second traffic lane, causing a situation of inequality of supervision between the possible offenders, since if there exists an electronic supervision system, the ideal situation is that all vehicles are treated equally. Therefore, the present invention discloses a method that provides switching to alter the source of capture of images, from the front camera to the rear camera upon a possible offender being detected with the red light on, rendering it possible to acquire, in one sole capture channel, the images of the from and rear of the possible offender. An identical case occurs with the capture of excess speed images of the vehicle that travels on the second lane that is contiguous to the location along which are installed the image capture cameras and which at the moment of capture is obscured by a large vehicle traveling along the lane that is contiguous to the location along which the cameras are installed.

There has also been developed an interesting use for the images acquired in real time on the spot, using a static or dynamic capture equipment with provision of pre-event and post-event, by means of analysis of the images, avoiding the establishment of a physical association between the semaphore and the new system and method of recording of events such that the latter might be able to know when the semaphore is lighted in red, yellow or green. The instant applicant has developed an analysis of the color of the dots (pixels) by means of analysis of the x/y coordinates of the screen, comparing the same with the color analysis by similarity of a location of a pre-acquired image. Therefore, using the camera that acquires the images of the semaphore, the vehicles and the crossing, the new system and method is informed not only whether the semaphore is red, but also whether it is green and yellow without requiring a connection between the semaphore and the new system and method, thereby saving a significant amount of public money otherwise required to dig trenches, laying of underground ducting, junction boxes, reforming the pavement or the sidewalks, post-implementation maintenance, etc.

The new system and method described herein also allows the operation of static and dynamic type systems with pre- and post-event, without the need of having all the elements of the new system and method placed together at each monitored crossing or at points for capture of excess speed infractions. Therefore, only the cameras may be placed at the crossing to acquire the images, and the processing and storage units may be placed at a remote location, or yet may be all grouped in a central facility whereto converge all the images of all points subject to monitoring. The interconnection between the cameras and the centralized facilities may be provided by wireless communication, by infrared communication, by a cable or optic fiber network, via satellite communication or any other possible form of communication. When there are used physical detectors, the signals from such detectors should also be sent, using the previously mentioned forms of communication, to processing or storage units, however when there are used virtual detectors by means of analysis of images, it will suffice that the video images be carried over to the processing and storage units. The separate implementation of these elements avoids the destruction or loss of these units by collisions or theft when they are installed in urban roads.

The new system and method also provides, in an approach where a red light will be advanced or a stop will occur over the pedestrian crossing strip, the monitoring of two, three or more traffic lanes, distinct from one another and where the red light does not occur simultaneously. There may exist a left lane for whoever intends to turn left with the respective semaphore showing a red light, besides this lane there may exist a central lane for vehicles intending to proceed straight ahead, with another semaphore which red light comes on at a different time in relation to the start of the red light of the left lane semaphore, and on the right side there may further exist a right turn lane also served by an exclusive semaphore which turns red at a different time in relation to the other two semaphores, and which provides its signal to the vehicles that intend to turn right. In this example, the question to consider is: how would one supervise, with only one equipment enabled with the present system and method, a multiplicity of traffic lanes approaching the same location, where the red lights will come on at different times? The solution provided by the present system and method consists in associating each detector, be it of physical type, using microwaves, infrared beams, laser beams, or of virtual type, using image analysis, each such detector related to each traffic lane, to its corresponding semaphore. There are further created three chronometers with levels of resolution of the order of minutes, seconds and at least two digits for tenths of a second, associating each chronometer to a set comprised by a semaphore and a detector. In this manner, each traffic lane is monitored individually at the level of precision of its detector, thereby enhancing the effectiveness of the system.

By using the virtual detector, the present applicant developed, in the new system and method with pre-event and post-event, a double-mode speed measurement, whereby the accuracy of the measurements is increased. Therefore, in the already existing form, the vehicle, on passing by the virtual detectors, is detected at each of these, and the latter feed information to a physical arithmetic speed calculation module. In the new system and method, the present applicant added to the virtual motion detector module certain program instructions to inform the distance between the virtual detectors, and being thus provided with the information of the distance between its virtual detectors, the module is able to calculate the speed at which the vehicle is traveling. This function will be designated as speed calculation by a virtual module. The instant applicant has further added a result comparison module which upon receiving two measurements, one originated from the virtual module and the other originating from the physical arithmetical module, performs a comparison to ascertain whether the results evidence the same quantity or are within the previously established threshold of tolerance. If the values are identical or are within the predetermined tolerance threshold, they will be sent for verification of excess speed and will be used or not to trigger the processes dependent thereon. If the values are not within the tolerance threshold, but at least one of the results configures a violation of the speed limit applicable in the road, there will be recorded the sequences of pre-event and post-event, in the predetermined quantities, and the event will bear in each frame thereof the two speeds as an indication of anomaly and will be stored at an appropriate location for such purpose. If there occurs an accident, the images of this event may be subsequently subjected to visual analysis, there being further obtained a third speed measurement by means of the observation of two or more physical or virtual reference points of the lane and the time taken by the vehicle to cross the same, using as a time reference a chronometer shown onscreen with a precision of the order of tenths of seconds.

Under the principle that the Law is equally applicable to all without distinction, one category of vehicles is becoming known for committing various infractions such as advancing red lights and traveling above speed limits, among others, without having to answer for such infractions. This category is that of motorcycles, which numbers are increasing faster than four-wheel vehicles, in units sold per year, causing an inoperability of supervising system. It occurs that the physical or virtual detectors, on being implemented relatively to a traffic lane, are either located at the center thereof and only detect motorcycles that pass directly over them and fail to detect motorcycles passing aside from their position, or are located to cover the entire area of the traffic lane, rendering impossible to ascertain the exact speed of a motorcycle passing by the detector simultaneously with another motorcycle, as it constantly happens that a motorcycle passes the first detector and proceeds on its way towards the second detector, one other motorcycle will again be passing the first detector and arrives at the second detector before the first motorcycle, obviating any possibility of accuracy in measurement of the speeds and thus rendering it legally impossible to prosecute a possible offender. By using the virtual detector, the present applicant has developed, in the new system and method, the multiple detectors method, creating multiple virtual lanes. With this new method, the chances of individualization and supervision of the actions of each motorcycle increase geometrically, reestablishing the equilibrium among the main users of the roadways system, that are vehicles and motorcycles. In this characteristic using the concept of multiple lanes, we may use a configuration of 2, 3, 4 or more multiple lanes where there is actually one traffic lane for vehicles. A system that is much more complicated and costly, but which should not be left unmentioned, is a system with multiple physical detectors, whereby are created multiple physical lanes.

One form of rendering feasible the implementation of multiple monitoring lanes for motorcycles where there is actually only one lane for vehicles is by using the new system and method, statically or dynamically, employing presence sensors with combined technology of microwaves, infrared beams or another vehicle detection method, implemented along the vehicle traffic lane or above the same when there are more than two traffic lanes on the road. With the use of these sensors, as well as with the use of video detection sensors, there is no requirement to perform cuts through the asphalt (invasive physical method) which implementation and maintenance are expensive. One second use of these sensors' supporting structures might consist in the installation of lighting means to facilitate the visualization of vehicles during the night hours.

The new system and method with capture of more than one frame of the possible infraction and with the existence of a pre-event and a post-event has been provided with the addition of the method for capture of images of the possible offender taken from the front and from the rear. The use of a large number of frames, together with the capture of the pre-event and the post-event, added to the use of at least two angles of capture, contribute to solve situations of doubt that might subsist in some events, such as for example a situation where a fireman or an ambulance, upon requesting the right of way with the siren turned on, might cause the recording of images of conventional vehicles advancing the signal, and upon the same passing by the detector, the semaphore will already have turned green, thereby leaving the presence of any of these vehicles unrecorded and giving cause to doubts and controversy on whether there was actually a motive to cause the conventional vehicle to advance the crossing. One other situation occurs in roads with exclusive lanes for busses, where small vehicles that are not authorized to travel within such lanes are recorded by electronic still image capture equipment. It occurs that in many of these situations the driver of the small vehicle argues that he or she momentarily drove the vehicle over to the exclusive lane due to the presence of another vehicle stopped due to malfunction on the same lane, which situation allegedly required such change of lane in order to deviate from the broken vehicle and bypass the same for just a few meters, where in the picture it is not possible to see the broken vehicle which is behind the focused area nor the moment when it (the offending vehicle) returned to its own lane. In the new system and method, the method of capture with pre-event and post-event, combined with the use of a camera to acquire the image of the rear of the vehicle, fulfill this gap in correct enforcement of the Law with equal treatment for all.

An identical situation occurs in lanes where there are some exclusive traffic lanes to be used by trucks, in cases where such trucks divert to the lanes intended for smaller vehicles for any number of reasons, one such reason being the fact that the exclusive truck lane pavement is irregular, and upon being caught traveling on such improper lane, their drivers argue that they were overtaking a slower truck, where the slower truck does not appear in the photograph due to the fact that that was the moment when the former (the offender) would begin its return to the proper lane.

BRIEF DESCRIPTION OF THE FIGURES

The system according to the present invention will be described with reference to the attached drawings, wherein.

DETAILED DESCRIPTION OF VARIOUS EMBODIMENTS

Figure 1:
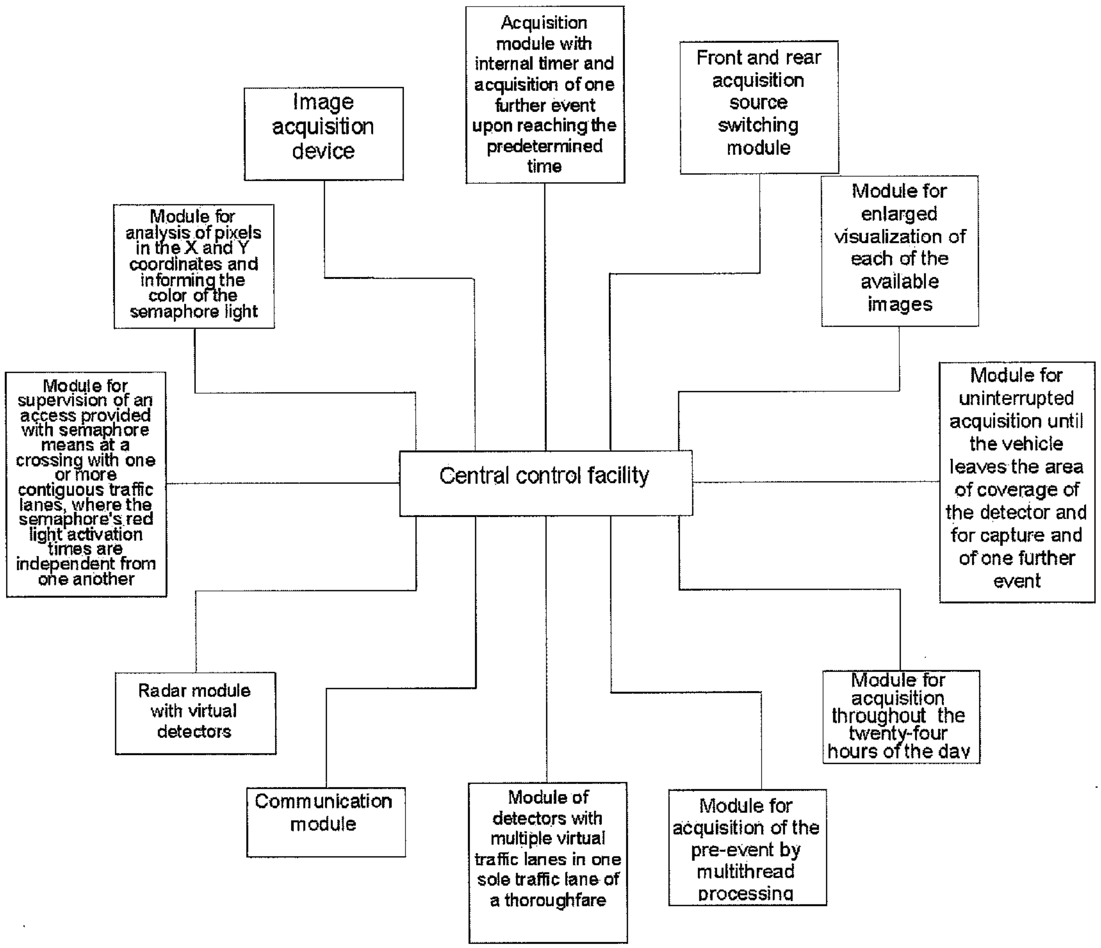
FIG. 1 depicts the general scheme of the system according to the invention.

FIG. 1 depicts a general scheme of the system according to the invention, comprising a module with multiple threads of capture of pre-events, a module that acquires images on a twenty-four hour per day basis, a module that allows the enlargement of each of the 4 or more images with the said images in motion, a module that upon acquiring an event keeps reading out the detector until the vehicle leaves the area of coverage thereof, and subsequently initiates the capture of one more event, a module that upon initiating the capture of an event starts an internal timer, and if there continues to exist a presence in the detector, after a predetermined period of time initiates the capture of one more event, a modules that performs a switching function, altering the source of capture of the images from the front camera to the rear camera in one sole channel, a module that, by means of dot (pixel) color analysis in the X and Y coordinates of the screen, is able to determine when the semaphore shows a red light, a yellow light or a green light, without requiring a physical connection between the semaphore and the system, a module that enables one sole item of equipment to supervise an access way provided with semaphore means leading to a crossing, with two and three contiguous traffic lanes, with two or three semaphore means which red lights are activated at different times independently from one another, a speed measuring radar using virtual detectors, a multiple detector module that creates multiple virtual traffic lanes in one sole traffic lane of a road.

Figure 29:
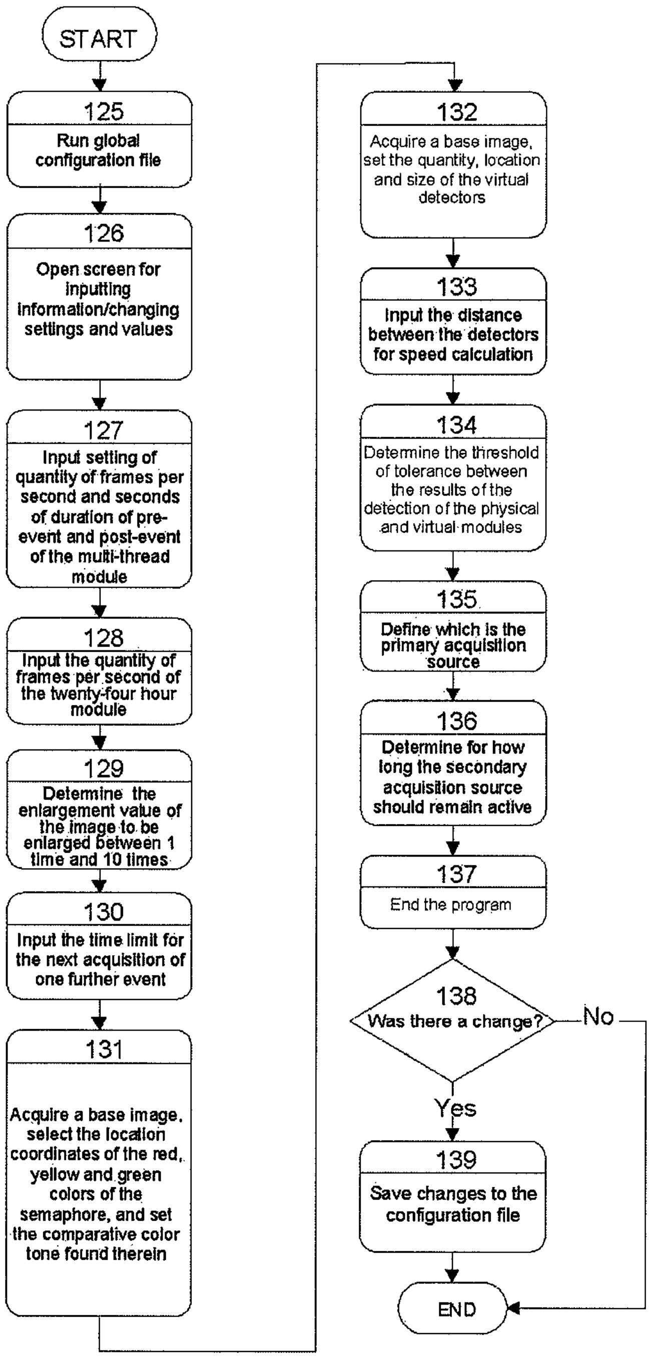
FIG. 29 is a block diagram of the configuration module.

FIG. 29 shows the configuration means wherein reside the global parameters that are used for the operation of various modules of the new system and method. To input or alter data: Run the global configuration file 125, whereby is opened a screen for inputting/altering settings and values 126, insert the settings of quantity of frames per second of pre-event and post-event of the multi-thread module 127, insert the setting of quantity of frames per second in the twenty-four-hour module 128, set the picture enlargement value and whether the same should be shown enlarged at a ratio between 1 (one) time and 10 (ten) times the original size 129, input the time limit for the next capture of one further event 130, acquire a base image, select the location coordinates of the semaphore red, green and yellow colors and set the color tone for comparison of the red, green and yellow colors detected therein 131, acquire a base image, set the quantity, location and size of the virtual detectors 132, input the distance between detectors for speed calculation 133, set the tolerance threshold between the results of the detections carried out by the physical and virtual modules 134, define the primary capture source 135, set the time during which the secondary capture source should remain active 136, end the program 137, check whether there have been made alterations 138, and in case that no alterations were made, finish the process, and in case of alterations, save the alterations in the configuration file 139 and finish the process.

Figure 30:
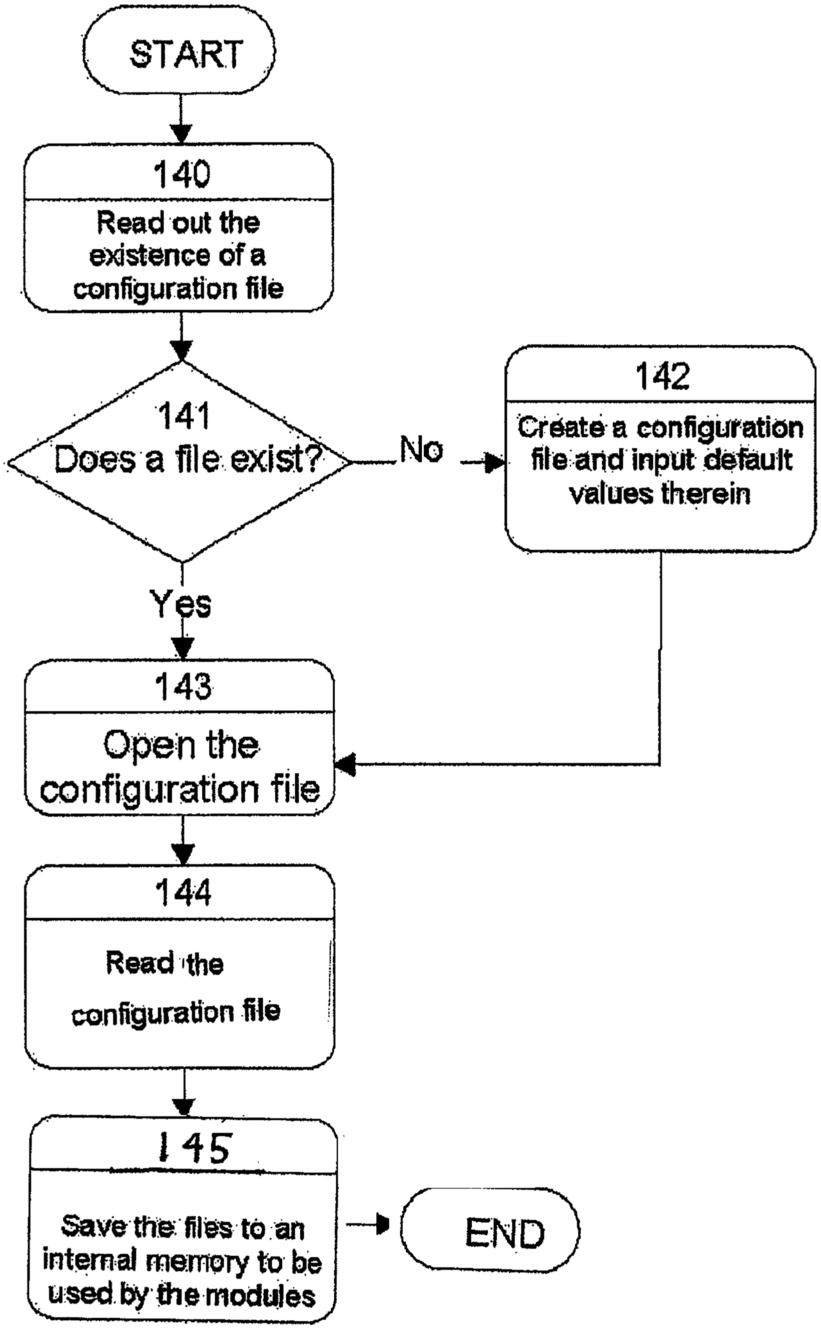
FIG. 30 is a block diagram of the system initialization routine.

Configuration Parameters (FIG. 30)

The program starts, reads the existence of a configuration file 140, checks whether a configuration file exists 141, if no file exists, it creates a configuration file and provides the same with default settings 142, if there exists a configuration file, the program opens the configuration file 143, reads the configuration file 144, saves the values to an internal memory for utilization by the modules 145.

Figure 2:
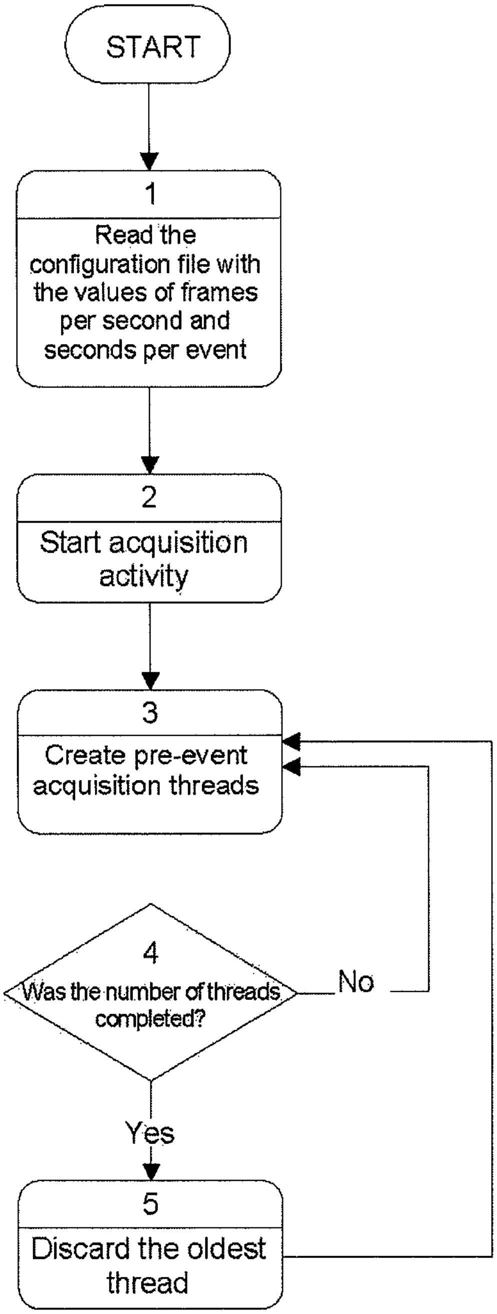
FIG. 2 is a block diagram representing the operation of the first of other forms of routine of the multi-thread pre-event capture module.
Figure 3:
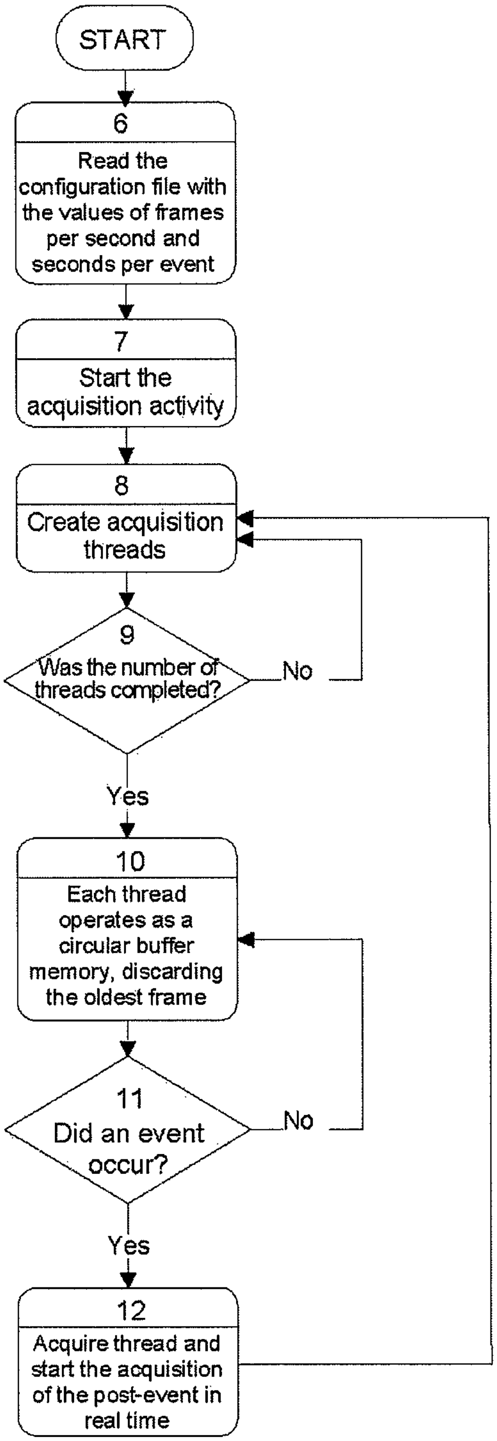
FIG. 3 is a block diagram representing the operation of the second of other forms of routine of the multi-thread pre-event capture module.
Figure 4:
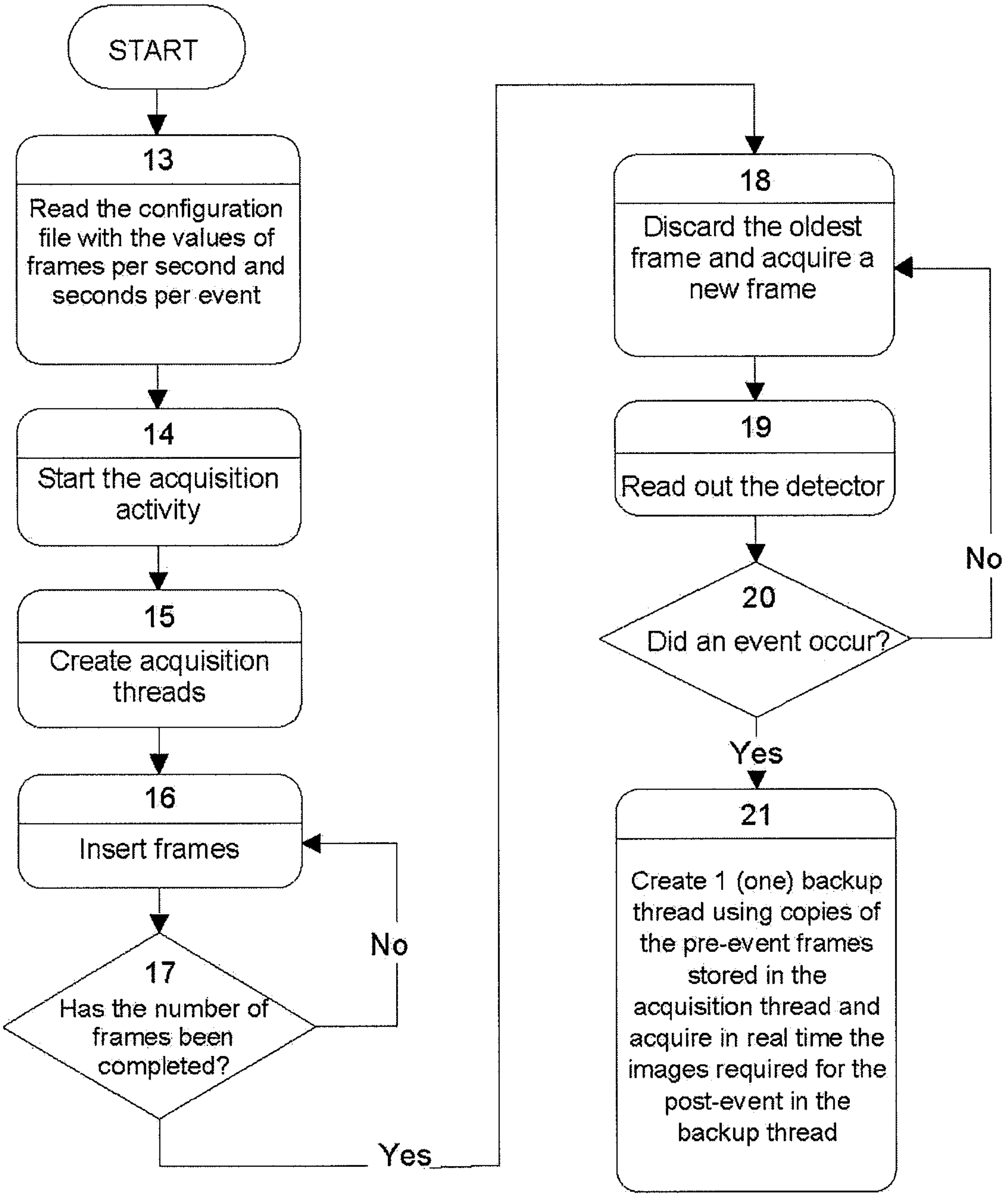
FIG. 4 is a block diagram representing the operation of the third of other forms of routine of the multi-thread pre-event capture module.

Subsequently the system runs one of the forms of multi-thread capture routine described in FIG. 2 or 3 or 4, that were preselected at the time of establishment of the firmware, to operate in the new system and method.

Multi-Thread Pre-Event Capture: (FIG. 2)

The program starts by reading the configuration file with the values of frames per second and seconds per event 1, initiates the capture activities 2, creates pre-event capture threads 3, checks whether the number of threads is completed 4, if it did not complete the number of threads, it creates capture threads 3, if it completed the number of threads, it discards the oldest thread 5 and creates a new thread 3. If there occurs an event of infraction, it takes a completed pre-event thread that is about to be discarded, acquires the post-event in real time and continues to run the remaining processes.

Multi-Thread Pre-Event Capture: (FIG. 3)

The program starts by reading the configuration file with the values of frames per second and seconds per event 6, initiates the capture activities 7, creates capture threads 8, checks whether the number of threads is completed 9, if not completed it creates capture threads 8, if the number of threads has been completed, each thread functions as a circular buffer memory, discarding the oldest frame 10, checks whether an event occurred 11, if no event occurred each thread functions as a circular buffer memory discarding the oldest frame of each thread upon input of each new frame to each thread 10, if an event occurred, it acquires a completed thread and initiates capture of the post-event in real time 12, creates an capture thread 8, and continues to run the remaining processes.

Multi-Thread Pre-Event Capture: (FIG. 4)

The program starts by reading the configuration file with the values of frames per second and seconds per event 13, initiates the capture activity 14, creates capture threads 15, inserts frames 16, checks whether the number of frames is completed 17, if not completed it inserts frames 16, if completed it discards the oldest frame and acquires a new frame 18, reads out the detector 19, checks whether an event has occurred 20, if no event occurred it discards the oldest frame and acquires a new frame 18, if an event did occur it creates 1 (one) backup thread, copies the pre-event frames stored in the capture thread to the backup thread, and acquires in real time the images required to form the post-event in the backup thread 21 and continues to run the remaining processes.

Figure 5:
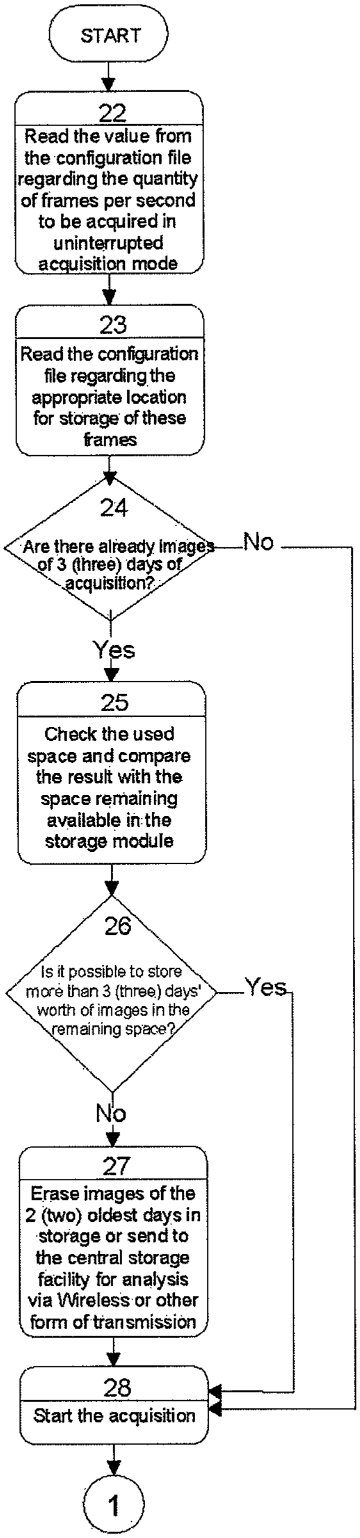
FIG. 5 is a block diagram representing the twenty-four-hour image capture module.
Figure 6:
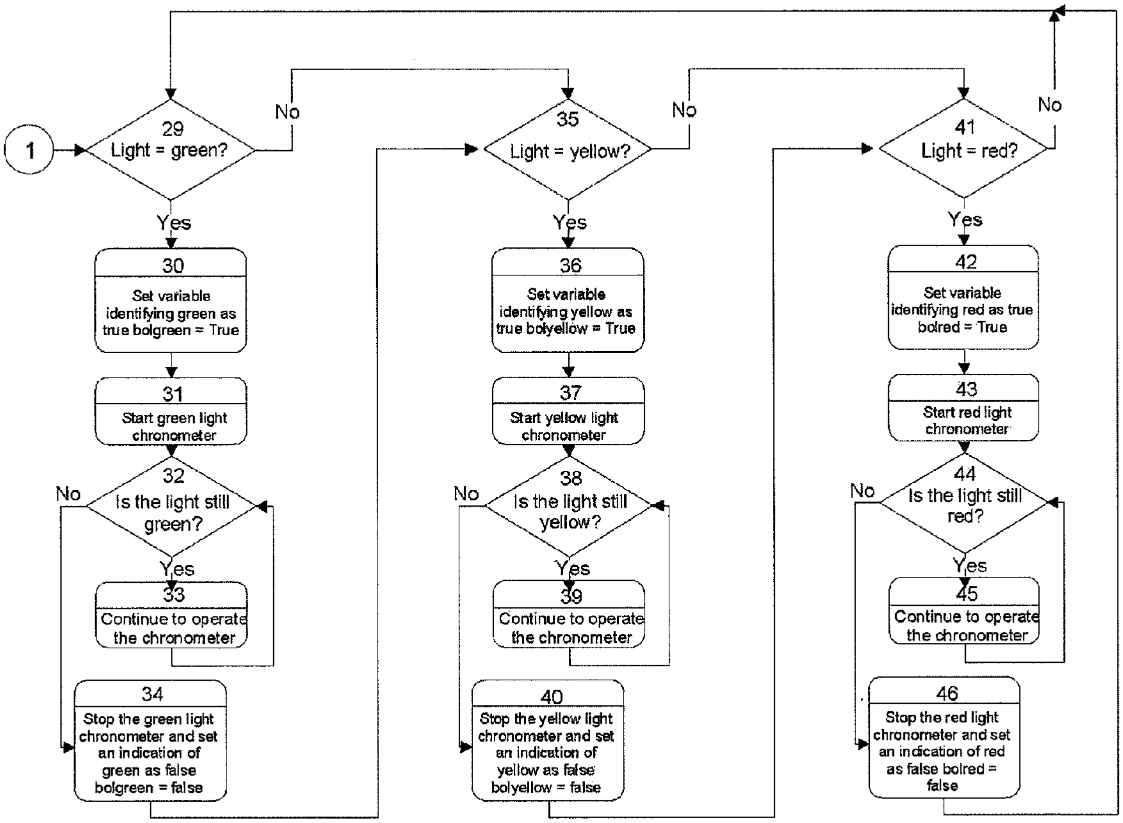
FIG. 6 is the continuation of the block diagram of the twenty-four-hour image capture module of FIG. 5.

Capture of Images During the Twenty-four Hours of the Day (FIGS. 5 and 6)

The program starts by reading from the configuration file the quantity of frames per second to be acquired in uninterrupted capture mode 22, reads from the configuration file the appropriate location for storage of frames 23, checks whether there already exist images of 3 (three) days of capture 24, if they do not exist it initiates the capture 28, if they already exist it compares the used space with the free space in the storage module 25, checks whether it is possible to store another 3 (three) days' worth of images 26, in the affirmative it initiates the capture 28, otherwise it erases images from the 2 (two) oldest days or sends the same for analysis at the central storage facility via wireless transmission or another form of transmission 27 and initiates the capture 28.

The program checks whether the light is green 29, and if it is not green, it checks whether the light is yellow 35, if it is green it sets a variable identifying the green color as true bolgreen-true 30, it starts a green light chronometer 31, checks whether the light remains green 32, in the affirmative it proceeds with the chronometer 33, it checks whether the light remains green 32, if it does not it stops the green light chronometer and sets an indication of green as false bolgreen=false 34, checks whether the light is yellow 35, if it is not yellow it checks whether it is red 41, if it is yellow it sets a variable identifying yellow as true bolyellow=true 36, it starts a yellow light chronometer 37, checks whether it is still yellow 38, in the affirmative it proceeds with the operation of the yellow light chronometer 39, it checks whether the light is still yellow 38, if it is no longer yellow it stops the yellow light chronometer and sets an indication of yellow as false bolyellow=false 40, checks whether the light is red 41, if the light is not red it checks whether the light is green 29, if it is red it sets a variable identifying red as true bolred=true 42, it starts a red light chronometer 43, checks whether the light is still red 44, in the affirmative it proceeds with the operation of the chronometer 45, it checks whether the light remains red 44, if it does not it stops the red light chronometer and sets an indication of red as false bolred=false 46, and checks whether the light is green 29. At the end of 24 hours of capture; it checks whether there already exist images of 3 (three) days of capture 24, if these do not exist it starts the capture 28, if they already exist it compares the used space with the available space in the storage module 25, checks whether it is possible to store more than 3 (three) days' worth of images 26, in the affirmative it initiates the capture 28, otherwise it erases images from the 2 (two) oldest days in storage or sends these images to the central storage facility for analysis therein, via wireless transmission or another manner of transmission 27, it initiates the capture 28 and continues the operation of the remaining processes.

Figure 7:
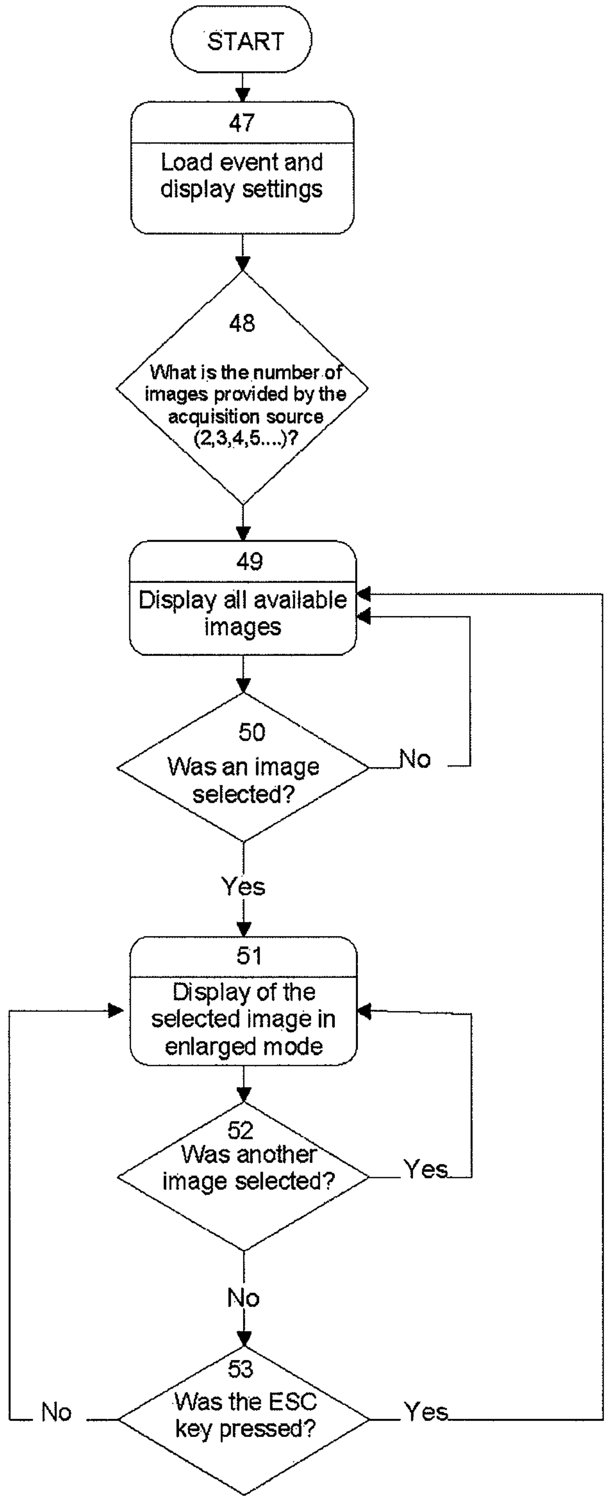
FIG. 7 is a block diagram representing the enlargement module of each of the 4 or more moving images.

Enlargement of Images: (FIG. 7)

The program starts by loading an event and display configuration 47, checks the number of images provided by the capture source (2, 3, 4, 5 . . . ) 48, displays all available images 49, checks whether an image was selected 50, if no image was selected it displays all the available images 49, and if an image was selected it displays the selected image in enlarged mode 51, it checks whether another image was selected 52, in the affirmative it displays the selected image in enlarged mode 51, otherwise it checks whether the <Esc> key was pressed 53, if it was not pressed it displays the selected image in enlarged mode 51, and if the <Esc> key was pressed it displays all the available images 49.

Figure 8:
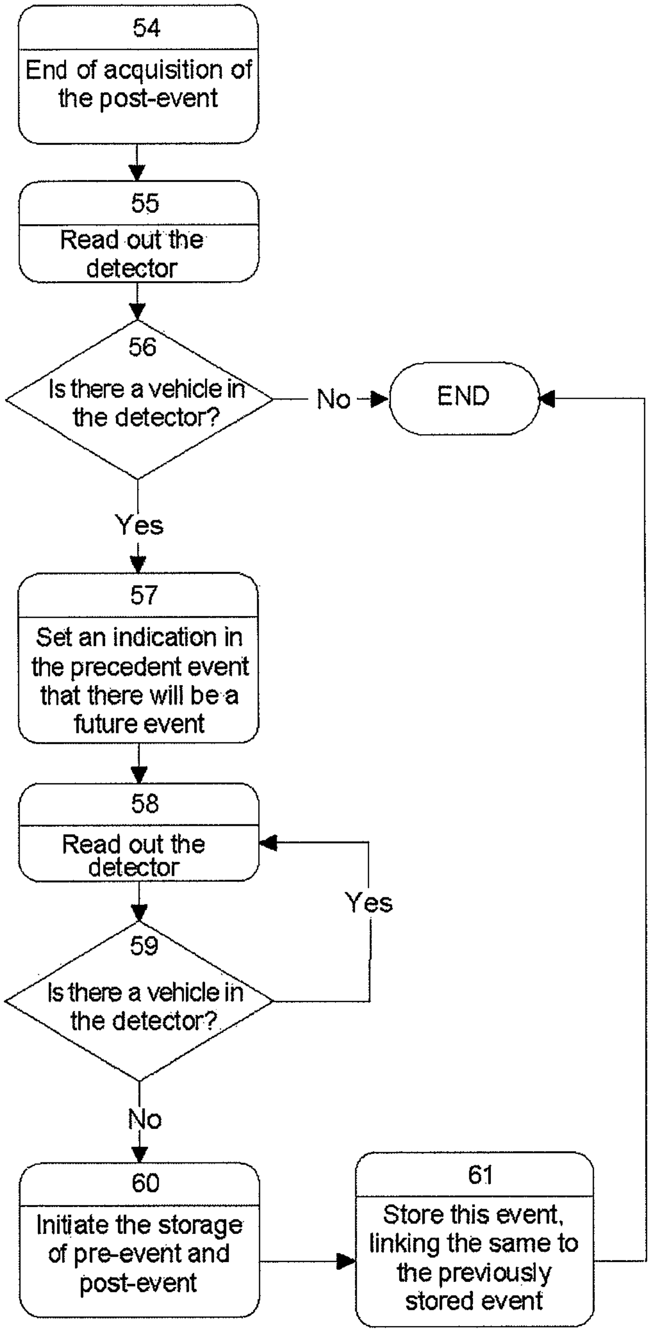
FIG. 8 is a block diagram representing the module of capture of more than one event when the vehicle leaves the area of coverage of the detector.

The program Acquires one Further Event Upon the Vehicle Leaving the Area of Coverage of the Detector: (FIG. 8)

The module for capture of a further event uses the detectors to trigger and acquire, by means of the cameras, the images of an event upon the vehicle leaving the area of coverage of the detector. At the end of the capture of the post-event 54, the detector is read out 55, it is checked whether there is a vehicle present in the detector 56, if no vehicle is present the procedure is finished, if there is an indication of presence of a vehicle in the detector, there is set an indication in the preceding event to the effect that there will be a future event 57, the detector is read out 58, it is checked whether there is a vehicle present in the detector 59, if there is a vehicle present in the detector the detector is read out 58, if no vehicle is present in the detector there is initiated the storage of pre-event and post-event 60. This event is stored, linked to the previously stored event 61, and the operation is finished.

Figure 9:
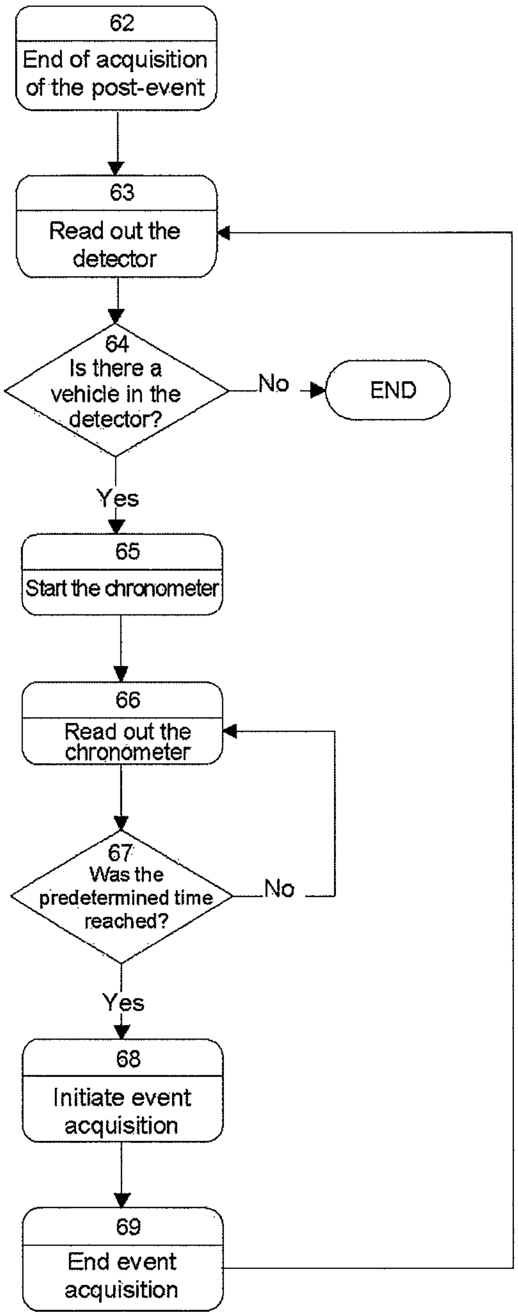
FIG. 9 is a block diagram representing the module of capture of more than one event after a predetermined period of time if the vehicle remains in the area of coverage of the detector.

Capture of one Further Event if the Vehicle Remains in the Area of Coverage of the Detector after a Predetermined Interval: (FIG. 9)

This module acquires one further event at each period of time if the vehicle remains in the area of coverage of the detector after the capture of the preceding event. At the end of the capture of the post-event 62, the detector is read out 63, it is checked whether there is a vehicle present in the detector 64, if there is no vehicle the procedure is finished, and if there is a vehicle there is started the chronometer 65, the chronometer is read out 66, it is checked whether the chronometer reached the predetermined time 67, if it has not, the chronometer is read out 66, if the predetermined time has been reached there is initiated the event capture 68, the event capture is finished 69 and the detector is read out 63.

Figure 10:
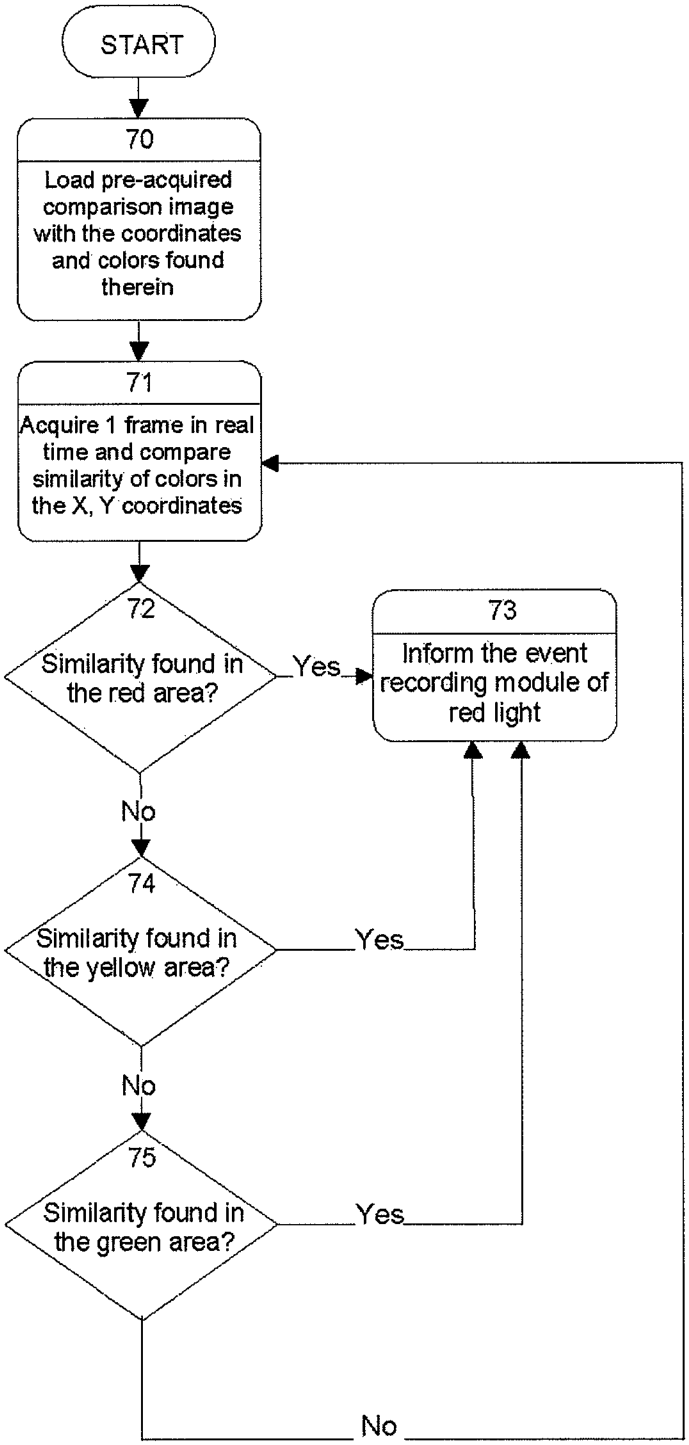
FIG. 10 is a block diagram representing the module that identifies the color of the semaphore light by dot color (pixel) analysis in the X and Y coordinates of the screen.

Pixel Analysis to Determine the Color of the Semaphore: (FIG. 10)

In this module, the semaphore green, yellow and red colors are detected by the new system and method by checking the results of analysis of pixels of certain x/y coordinates. Upon there being checked which color is lighted in the semaphore, this result remains available to the modules, for example, of recording of red light advancement, of 24-hour capture, etc. The program starts by loading a base image for comparison that was previously acquired with the coordinates and colors found therein 70. The module acquires one frame in real time and compares any similarity of color at the X, Y coordinates 71. The module checks whether there is a similarity in the red area 72, and in the affirmative it informs the red light event recording module 73, if it did not detect a similarity it checks whether a similarity was ascertained in the yellow area 74, in the affirmative it informs the red light event recording module 73, and if no similarity was ascertained it checks whether a similarity was found in the green area 75, in the affirmative it informs the red light event recording module 73, if no similarity was found it acquires 1 (one) frame in real time and compares similarity of colors in the coordinates X, Y 71.

Figure 11:
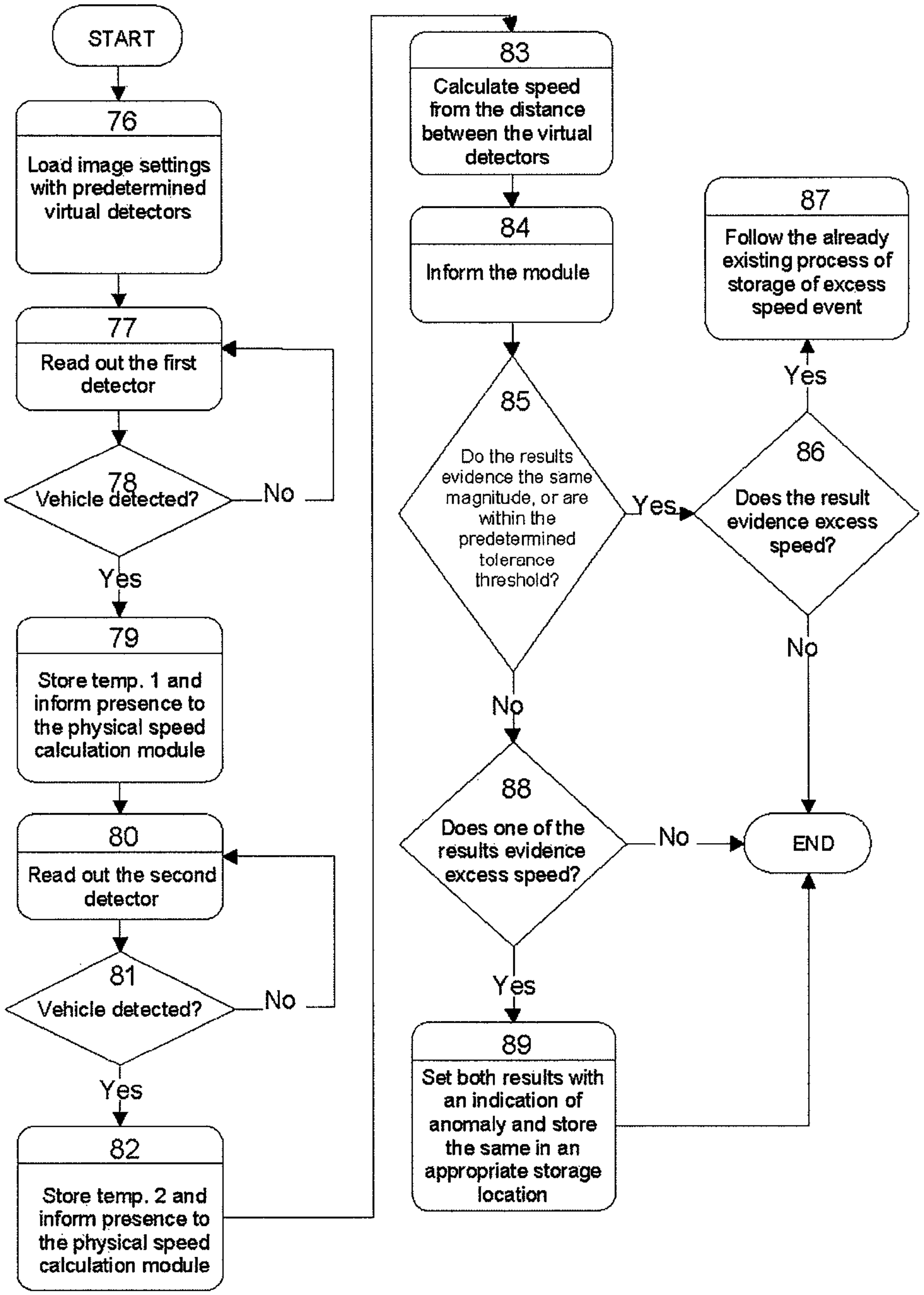
FIG. 11 is a block diagram representing the radar module with measurement of speed between virtual detectors.

Speed Measurement Radar with Virtual Detectors: (FIG. 11)

The radar performs the speed measurement in two manners: by means of the virtual module and by means of the physical arithmetical module. The program starts by loading the image configurations with previously determined virtual detectors 76, reads out the first detector 77, checks whether it has detected a vehicle 78, if no vehicle has been detected it reads out the first detector 77, if a vehicle was detected it stores temp.1 and informs the presence to the physical speed calculation module 79. The program reads out the second detector 80, checks whether a vehicle has been detected 81, if no vehicle was detected it reads out the second detector 80, if a vehicle was detected it stores temp.2 and informs the presence to the physical speed calculation module 82, there is performed a calculation of the speed as a function of the distance between the virtual detectors 83, and the result is informed to the comparing module 84. The program checks whether the results are of the same magnitude or are within the predetermined tolerance threshold 85, in the affirmative it checks whether the result expresses a speed violation 86, and if the result in 86 is negative, it finishes the process, and if the result in 86 is affirmative, it continues the process of excess speed storage 87. If the results do not exhibit the same magnitude and are also not within the tolerance threshold in 85, the program checks whether one of the results expresses a speed violation 88, if it does not the program finishes the process, and if it does, the program records the event with both results with an indication of anomaly and stores the same in an appropriate location 89 and finishes the process.

Figure 12:
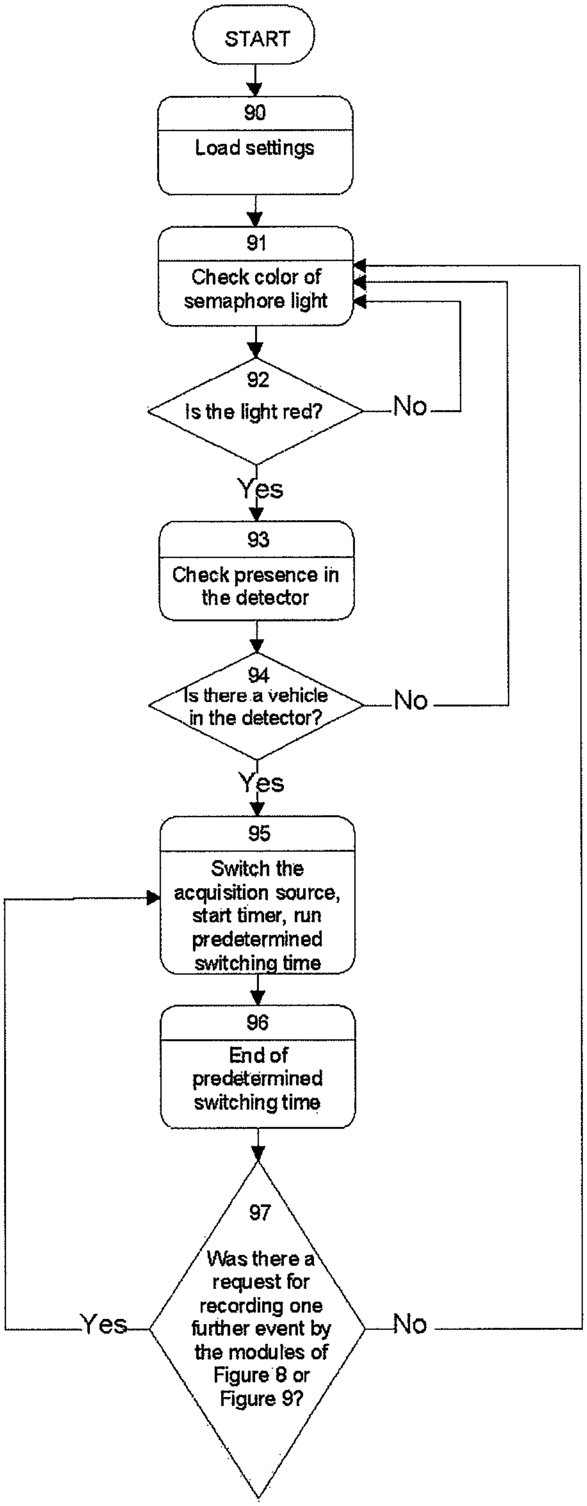
FIG. 12 is a block diagram representing the module for switching the source of capture of images from front to rear and vice-versa.

Image Capture Source Switching Means: (FIG. 12)

The cameras that acquire the image of the vehicle's license plate may first acquire an image taken from the front, and upon the vehicle triggering the detector they may acquire the image taken from the rear, or the reverse. This modules starts by loading the settings 90, reads the color of the semaphore 91, checks whether the light is red 92, if it is not red it reads out the color of the semaphore 91, if it is red it reads out the detector 93, it checks whether there is a vehicle present in the detector 94, if no vehicle is present it reads out the color of the semaphore 91, if there is the presence of a vehicle in the detector it switches the capture source, starts the timer, operates according to the predetermined switching time 95, completes the predetermined switching time 96, checks whether there was a request of recording of one further event from the modules of FIG. 6 (six) and FIG. 9 (nine) 97, if there was a request, it switches the capture source, starts the timer, operates for the predetermined switching time 95, and if there was no request it reads out the color of the semaphore light 91.

Graphic Representation of the Image Capture Source Switching Means: (FIG. 13)

Figure 13:
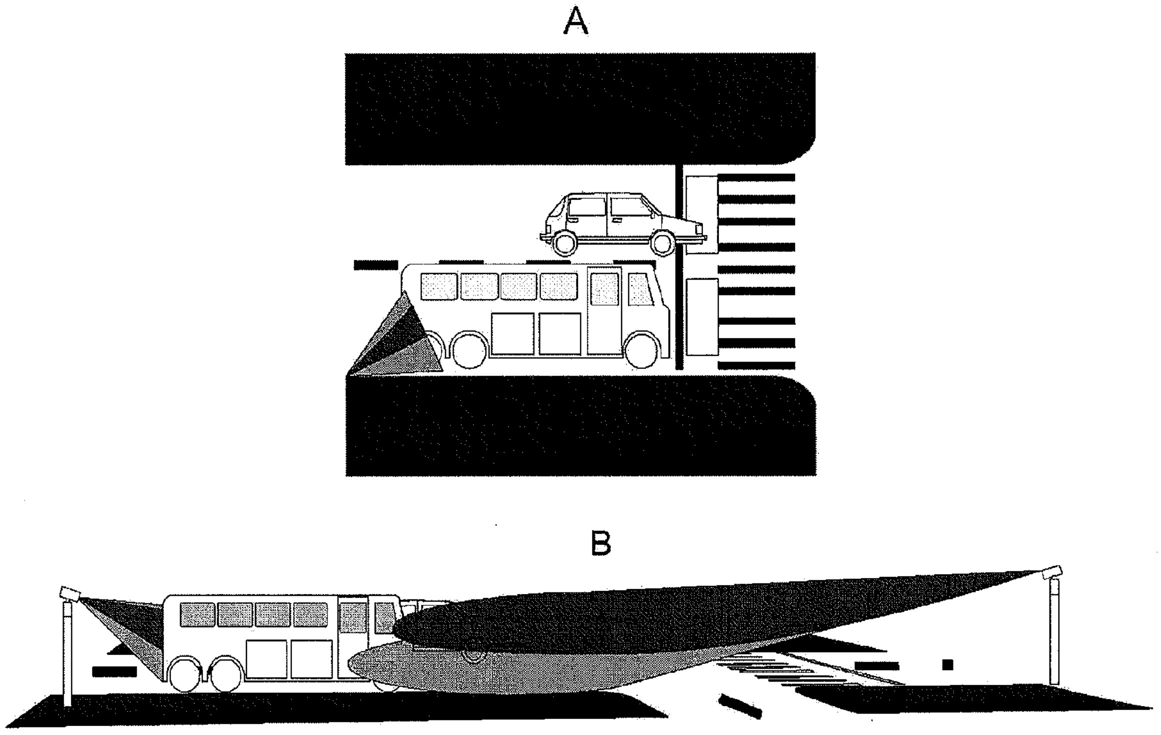
FIG. 13 represents, in a first graphic form (a), the image of the vehicle not being acquired and in the second graphic form (b) the image of the vehicle being acquired.

FIG. 13 shows the problem with the focus of the rear image that is obstructed by the presence of a large vehicle such as a bus, which completely jeopardizes the capture of images of a possible offending vehicle that is traveling on the second traffic lane. There is thus shown a system and method that performs a switching function, altering the image capture source from the front camera to the rear camera as soon as the possible offender is detected with the signal at red light, thereby rendering possible that with one sole capture channel there may be acquired the front and rear images of the possible offender. An identical fact occurs with the capture of images of excess speed of a vehicle traveling on the second lane, contiguous to the lane wherein are installed the image capture cameras, which vehicle at the time of passage by the detector is obscured by a large vehicle traveling on the lane contiguous to that of the cameras.

Graphic Representation of Image Enlargement: (FIG. 14)

Figure 14:
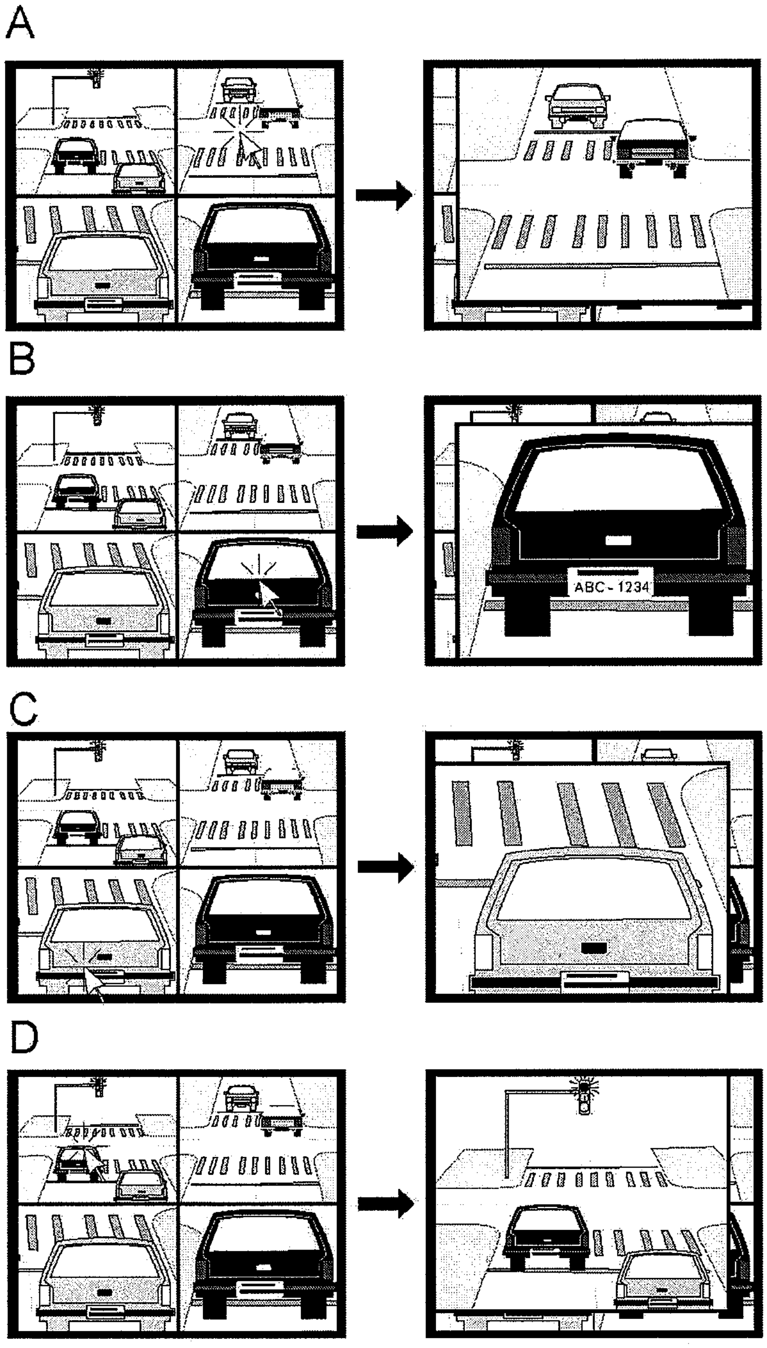
FIG. 14 is a graphic example of a set of images being enlarged in accordance with the block diagram of FIG. 7.

FIG. 14 is a graphic representation of an exemplary image during the display of an event.

Graphic Representation of Separate Cameras of the System and Method: (FIG. 15)

Figure 15:
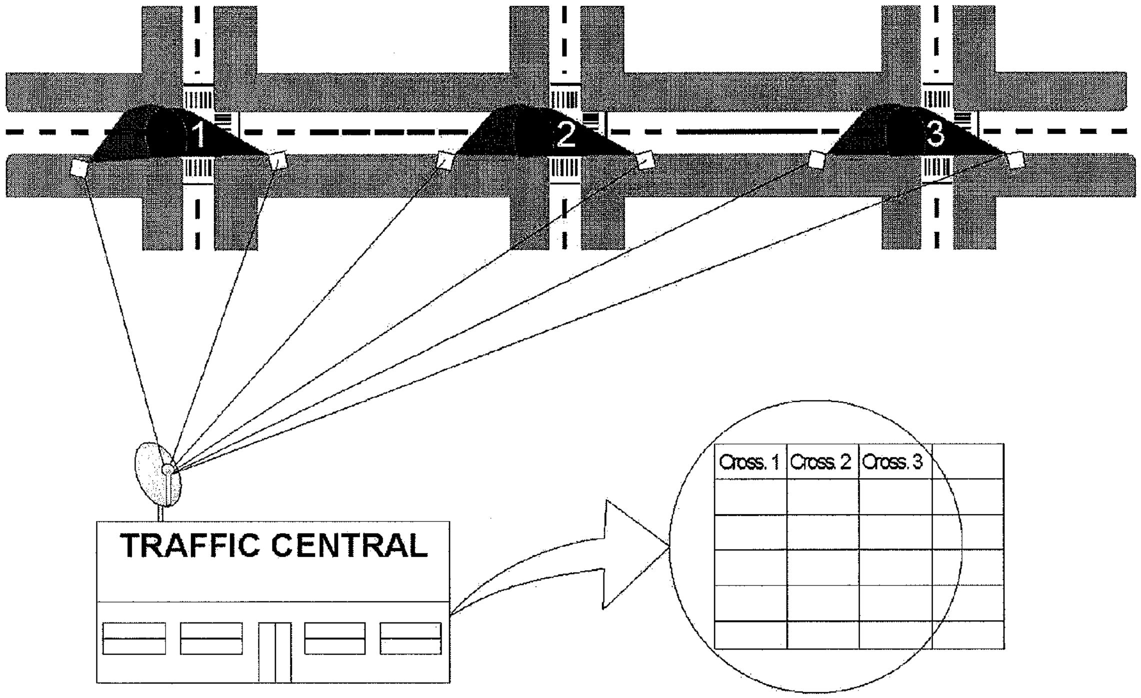
FIG. 15 represents, in graphic form, a system where only the cameras are positioned at the crossing to acquire the images, and the processing and storage units are located in a remote location or are all grouped at a central facility.

The FIG. 15 is a graphic representation showing that it is not necessary that all systems and method be present at each monitored crossing or at points for capture of excess speed infractions. Therefore, only the cameras may be located at the crossing to acquire the images, and the processing and storage units may be located at a remote location or may all be grouped at a central facility whereto will converge the images of all the points subject to monitoring. The form of interconnection between the cameras and the centralized facilities may consist in wireless communication means, a network of cables or optic fiber, by satellite communication or any other possible manner. When there are used physical detectors, the signals from these detectors should also be sent to processing or storage units, however when there are used virtual detectors operating by means of image analysis, it will suffice that the video images be carried to the processing and storage units, thereby avoiding the destruction or loss of these units when installed in the roads and subject to collisions or theft.

Figure 16:
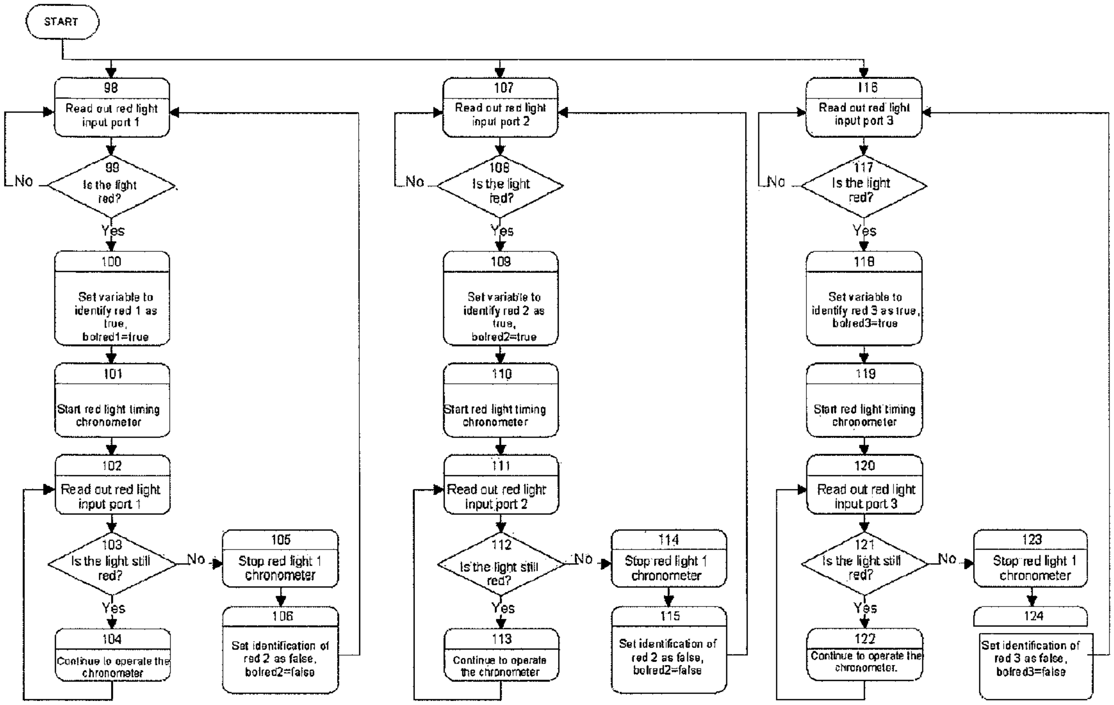
FIG. 16 is a block diagram of the module wherein one sole equipment item supervises an access way with semaphore means, with two or three contiguous traffic lanes, with two or three semaphores with independent red light activation times.

One Equipment Item with Several Red Lights Monitored Thereby: (FIG. 16)

This module monitors simultaneously several traffic lanes of an access way wherein are located semaphores which red light events are started differently. The module starts by reading out the red light input port 1 (one) 98, checks whether the light is red 99, if the light is not red it reads out the red light input port 1 (one) 98, if the light is red it sets a variable of identification of red light 1 (one) as true, bolred1=true 100, starts a red light chronometer 101, reads out the red light input port 1 (one) 102, checks whether the light is still red 103, if the light is still red it proceeds with the operation of the chronometer 104 and reads out the red light input port 1 (one) 102, if the light is no longer red it stops the red light chronometer 1 (one) 105, sets an identification of red light 1 (one) to false, bolred1=false 106, and reads out the red light input port 1 (one) 98.

Simultaneously with the readout of the red light input port 1, it reads out the red light input port 2 (two) 107, checks whether the light is red 108, if the light is not red it reads out the red light input port 2 (two) 107, if the light is red it sets a variable of identification of red light 2 (two) as true, bolred2=true 109, starts the red light chronometer 110, reads out the red light input port 2 (two) 111, checks whether the light is still red 112, if the light remains red it continues to drive the chronometer 113 and reads out the red light input port 2 (two) 111, if the signal does not remain red it stops the red light chronometer 2 (two) 114, sets an indication of red light 2 (two) as false, bolred2=false 115, and reads out the red light input port 2 (two) 107.

Simultaneously with the readout of the red light input ports 1 and 2, it reads out the red light input port 3 (three) 116, checks whether the light is red 117, if the light is not red it reads out the red light input port 3 (three) 116, if the light is red it sets a variable of identification of red light 3 (three) to true, bolred3=true 118, starts a red light chronometer 119, reads out the red light input port 3 (three) 120, checks whether the light is still red 121, if the light remains red is proceeds with the operation with the chronometer 122 and reads out the red light input port 3 (three) 120, if the light did not remain red it stops the red light chronometer 3 (three) 123, sets an identification of red light 3 (three) as false, bolred3=false 124, and reads out the red light input port 3 (three) 116.

Figure 17:
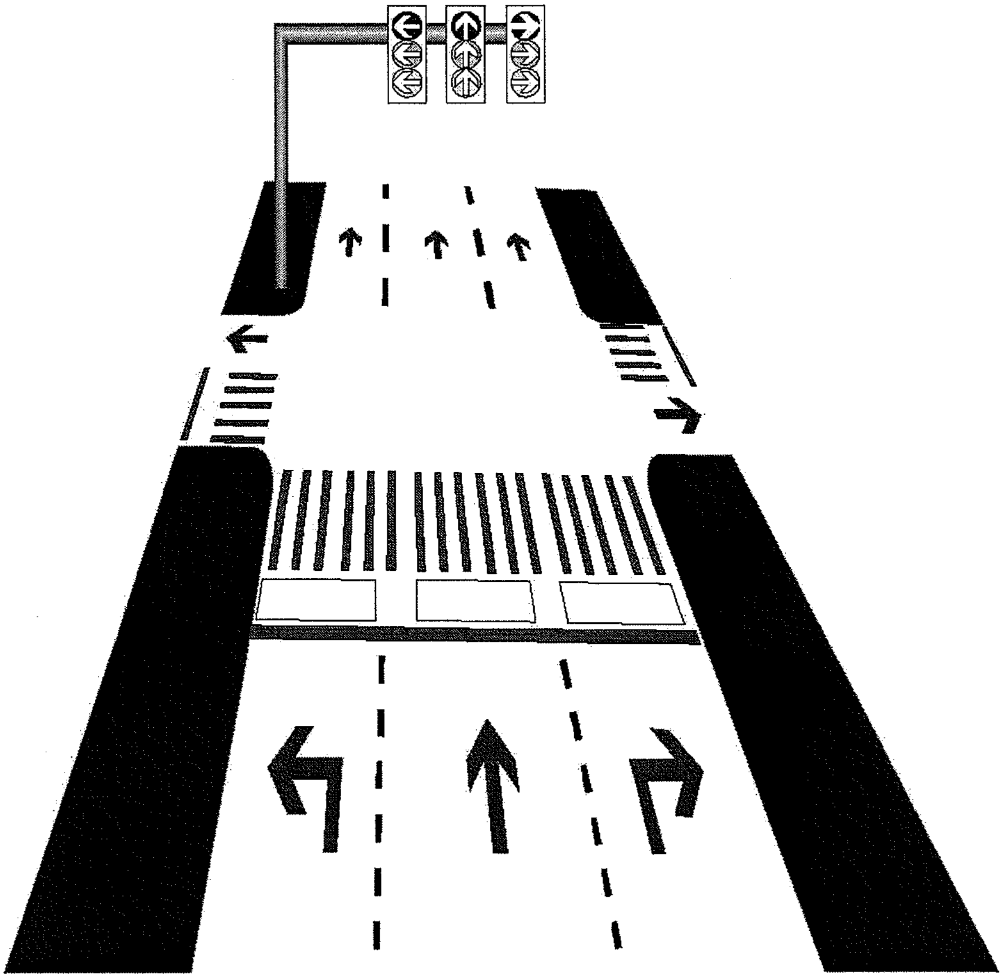
FIG. 17 represents, in graphic form, a case where one sole item of equipment supervises an access way provided with semaphore means, with two or three contiguous traffic lanes, with two or three semaphores with independent red light activation times.
Figure 18:
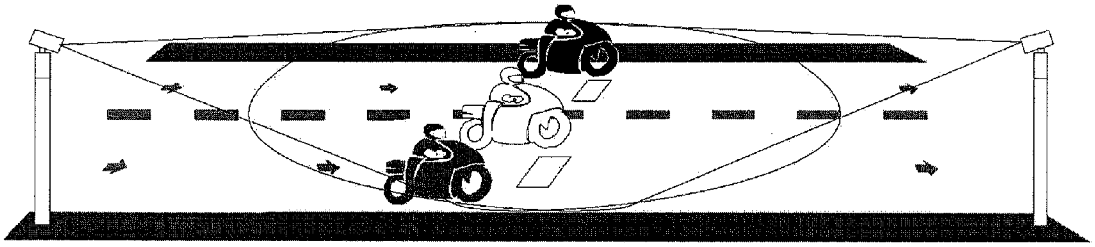
FIG. 18 represents, in graphic form, the difficulty in supervising motorcycles.

Graphic Representation of One Item of Equipment Monitoring Several Red Lights: (FIG. 17)

In this figure there is described a road with three traffic lanes wherein each traffic lane has a semaphore with independent directions, however with the new system and method only one item of equipment is required to monitor all situations, since each detector is connected to a specific semaphore and chronometer.

Graphic Representation of the Problem in Supervising Motorcycles: (FIGS. 18, 19, 20 and 21)

Figure 19:
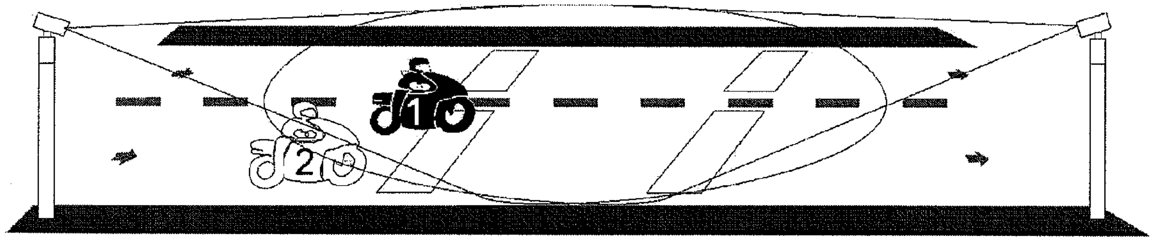
FIG. 19 is a continuation of the representation in graphic form of the difficulty in supervising motorcycles initiated in FIG. 18.
Figure 20:
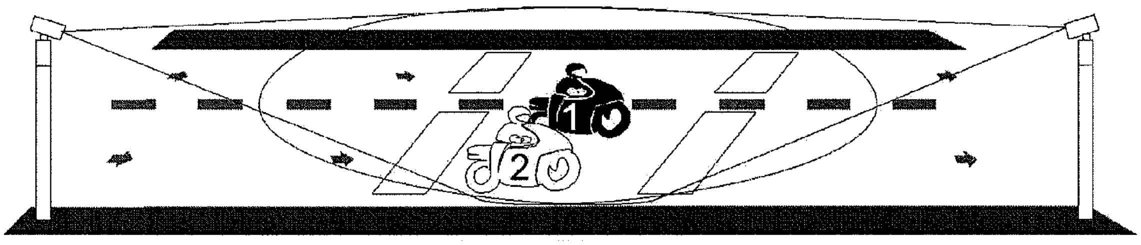
FIG. 20 is a continuation of the representation in graphic form of the difficulty in supervising motorcycles initiated in FIG. 18.
Figure 21:
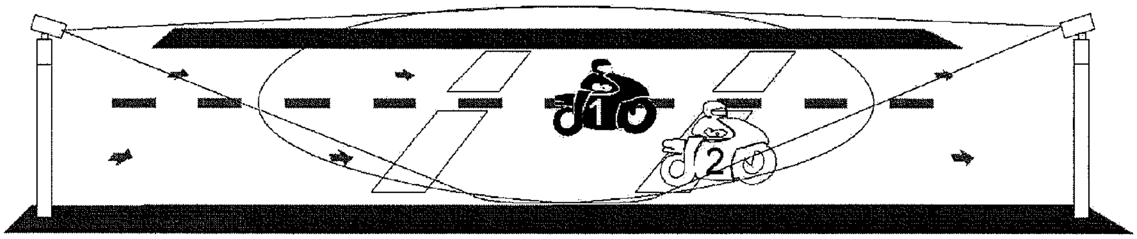
FIG. 21 is a continuation of the representation in graphic form of the difficulty in supervising motorcycles initiated in FIG. 18.

The physical or virtual detectors, on being established at the center of the traveling lane, only detect motorcycles that pass above the same and fail to detect motorcycles passing beside them. This enables some offenders to "deviate" from the detector. In the sequence of FIGS. 19, 20 and 21 it is shown that the physical detectors, when placed to cover the whole area of the road, do not allow the determination of the exact speed of a motorcycle that is passing by the detector simultaneously with another motorcycle, since it constantly occurs that one motorcycle will pass by the first detector and while it proceeds on its way to the second detector, another motorcycle will pass by the first detector and will arrive at the second detector before the first motorcycle, thereby obviating any possibility of accuracy in the measurement of speeds and thereby rendering it legally impossible to prosecute a possible offender.

Graphic Representation of Solutions to Supervise Motorcycles with Multiple Detectors: (FIGS. 22, 23 and 24)

Figure 22:
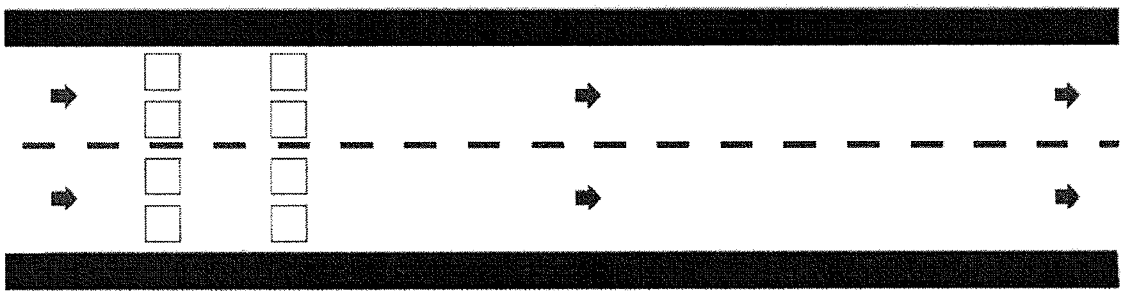
FIG. 22 represents, in graphic form, the first solution for supervising motorcycles, with multiple detectors, creating multiple virtual lanes in one lane of a road.
Figure 23:
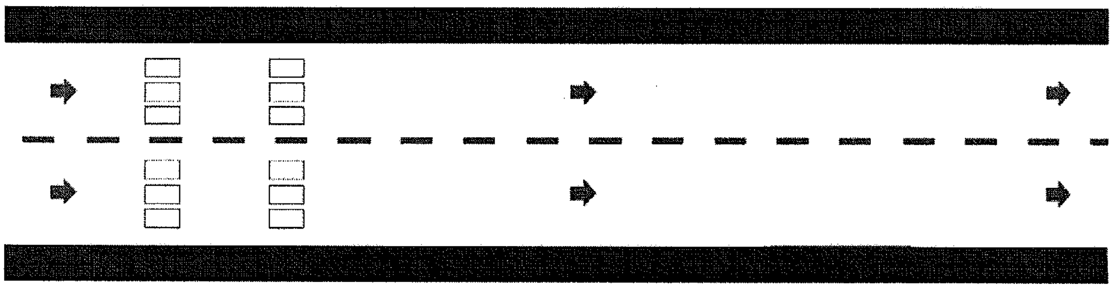
FIG. 23 represents, in graphic form, the second solution for supervising motorcycles, with multiple detectors, creating multiple virtual lanes in one lane of a road.
Figure 24:
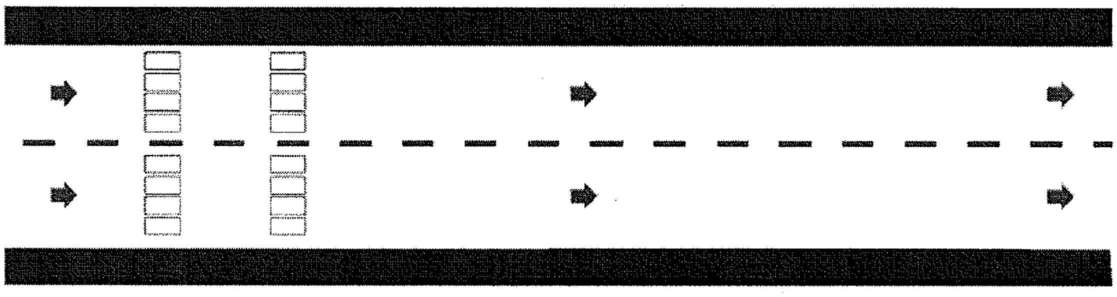
FIG. 24 represents, in graphic form, the third solution for supervising motorcycles, with multiple detectors, creating multiple virtual lanes in one lane of a road, FIG. 25, in letters "a" and "b", represents in graphic form a system that uses presence sensors with combined technology, implemented besides the vehicle rolling surface or above the same.

In the sequence formed by FIGS. 22, 23 and 24 there is shown the concept of multiple detectors that create multiple virtual or physical traffic lanes and thereby provide a geometrical increase of the chances to individualize and supervise the actions of each motorcycle, thereby reestablishing the equilibrium among the users of the roadways system. In this characteristic using the concept of multiple traffic lanes we may use a configuration of 2, 3, 4 or more multiple lanes where there is usually one single traveling lane for vehicles.

Figure 25:
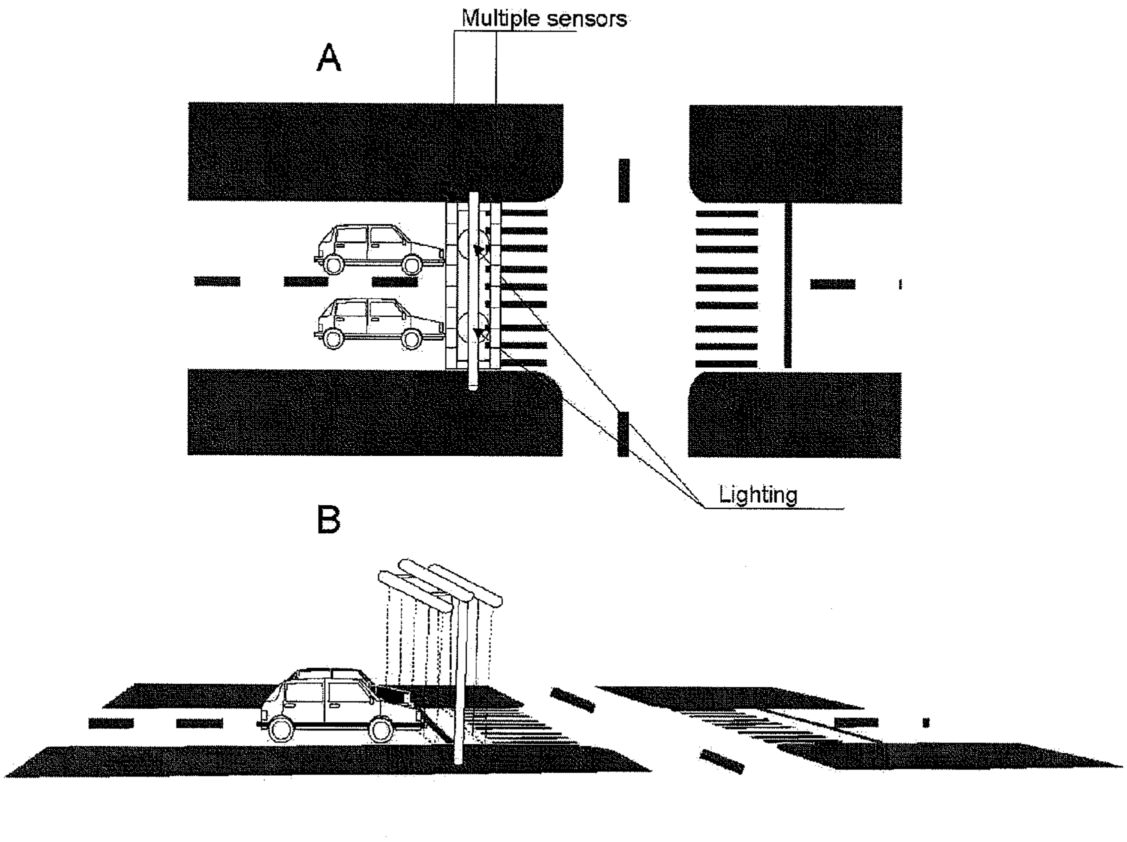

Graphic Representation of the Use of Multiple Sensors with Combined Technology: (FIG. 25, Letters a and b)

Figure 26:
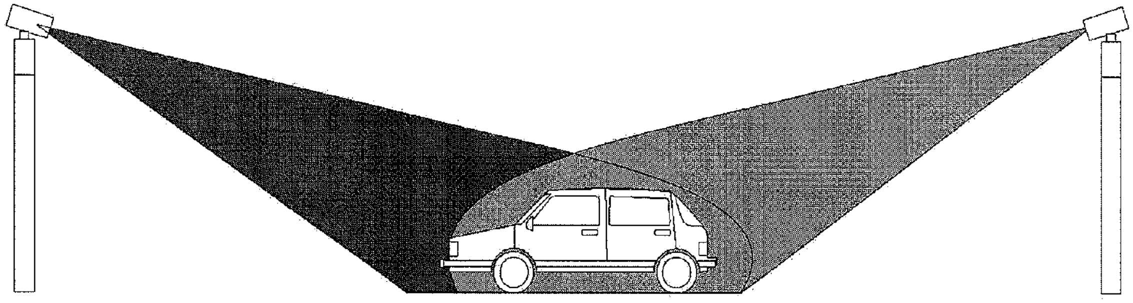
FIG. 26 represents in a first graphic form a system for capture of images of the possible offender from the front and from the rear, with capture of several frames of a possible infraction, with pre-event and post-event.
Figure 27:
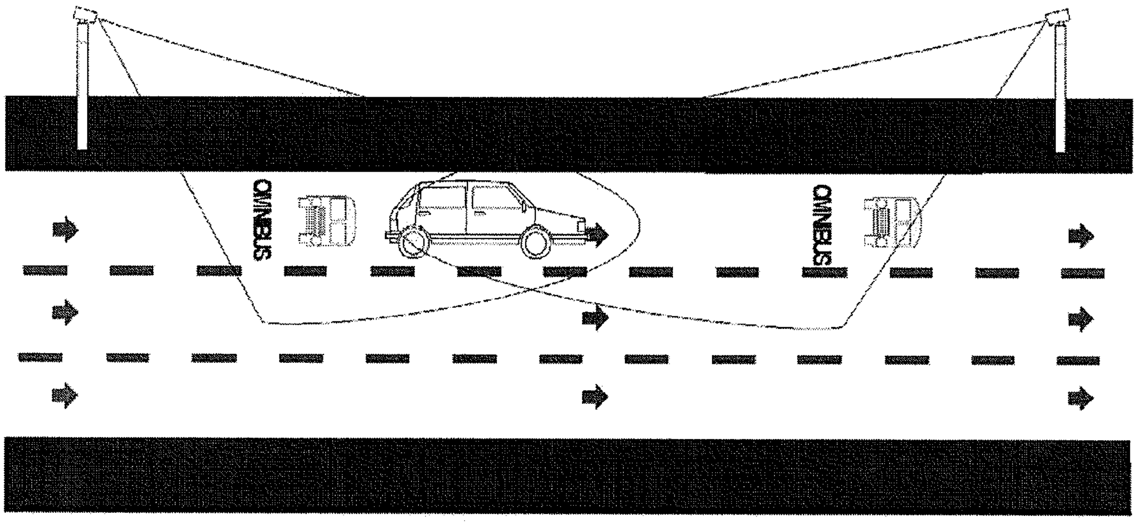
FIG. 27 represents in a second graphic form a system for capture of images of the possible offender from the front and from the rear, with capture of several frames of a possible infraction, with pre-event and post-event.
Figure 28:
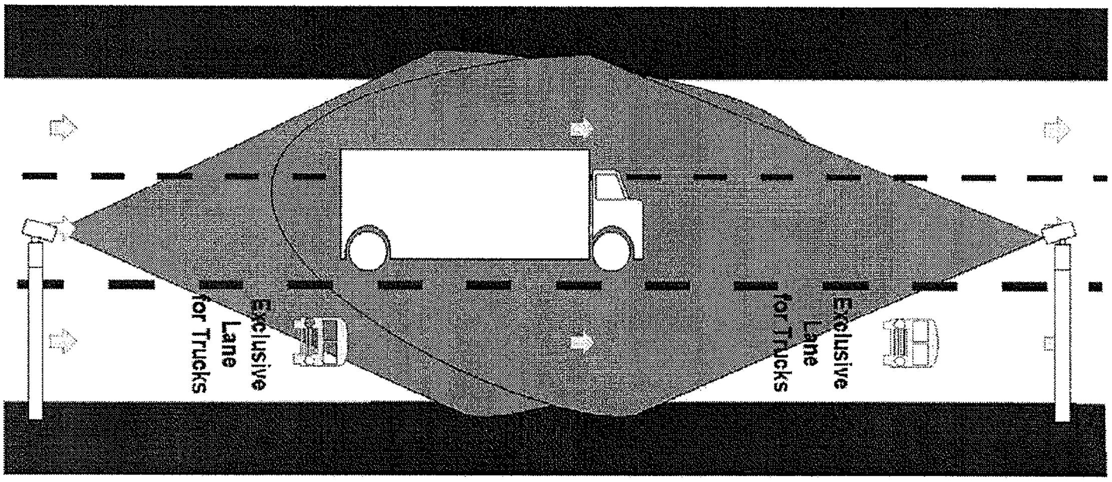
FIG. 28 represents in a third graphic form a system for capture of images of the possible offender from the front and from the rear, with capture of several frames of a possible infraction, with pre-event and post-event.

Graphic Representation of a System that Acquires Images from the Front and from the Rear: (FIGS. 26, 27 and 28).

The invention claimed is:

1. A system for monitoring and supervising potential traffic infraction events, said system comprising:

a single potential traffic infractions detector;

one or more image capture devices; and a single multi-thread capture routine configured to simultaneously generate a distinct thread for each one of a plurality of potential traffic infraction events occurring at least one of almost simultaneously or simultaneously in a same lane or in different lanes of a road, each distinct thread containing therein a complete record of simultaneously captured images of an associated one of the plurality of potential traffic infraction events, wherein:

separate and distinct threads of different traffic infractions may be simultaneously or almost simultaneously generated using the same one or more capture devices as another distinct and separate traffic infraction violation thread;

as many separate and distinct threads as a previously programmed number of frames per second may be created until fulfilling a total time of a pre-event;

upon creation of a circular buffer of the many separate and distinct threads, at least one thread that exceeds the total time of the pre-event is discarded and at least one new separate and distinct thread is simultaneously created to replace the at least one thread having been discarded;

each circular memory buffer discards an oldest frame upon input of each new frame in response to at least one of the plurality of potential traffic infraction events resulting in an actual traffic infraction event, the single thread capture routine is further configured to identify, retain, and use a thread having therein a complete record of simultaneously captured images of the actual traffic infraction event, and to simultaneously therewith create a new thread to replace the thread having been identified and used;

capture of the actual traffic infraction event is performed in real-time; and in response to two potential traffic infraction events occurring within a few thousandths of a second of difference between one another, the single thread capture routine is further configured to create one or more backup threads and to save the backup threads frames of pre-events existing in a sole capture thread, such that, upon occurrence of one or more actual traffic infraction events associated with the two potential traffic infraction events, each backup thread thereupon saves necessary images in real-time for the each of the backup threads.

2. A System of claim 1, further comprising a module for capturing the images throughout a long period of time.

3. A System of claim 1, further comprising a module that enables enlargement of each one of the images in order to allow visualization of details of the images captured by the one or more image capture devices.

4. A System of claim 1, further comprising a module which, upon capturing a potential traffic infraction event, continues to read out one or more vehicle detector devices until the vehicle leaves an area of coverage thereof, and thereupon starts capture of one further potential traffic infraction event.

5. A System of claim 4, further comprising a module which upon start of capture of a potential traffic infraction event, starts an internal timer, and in response to the event being continuously present in the one or more detector devices, with or without a red light signal active, initiates capture of one further potential traffic infraction event after a predetermined period of time.

6. A System of claim 1, further comprising a module which performs a switching function, alternating an image capture source from a front image capture device to a rear image capture device, or vice versa, using at least a single channel.

7. A System of claim 1, further comprising a module, by performing dot (pixel) color analysis on a X and Y coordinates of a screen, ascertains when a traffic signal light is red, yellow or green without using a physical interconnection between the traffic signal and the system.

8. A System of claim 1, wherein the one or more image capture devices are located in a road crossing to capture the images, and processing and storage units are located in a remote location or are all grouped together at a central facility.

9. A System of claim 1, further comprising a module which enables individual monitoring and supervision of each one of contiguous traffic lanes.

10. A System of claim 1, further comprising a speed measuring device to determine a speed based on a time taken by a vehicle to travel a virtual distance between two virtual detectors.

11. A System of claim 1, further comprising a multiple detector module, which comprises multiple virtual traffic lanes or multiple physical detectors applied to a single traffic lane.

12. A System of claim 1, further comprising one or more vehicle detection devices implemented along a vehicle traffic lane or above the vehicle traffic lane, said one or more detection devices being presence sensors using microwaves.

13. A System of claim 1, wherein the images of a possible offender are captured from front and rear of the possible offender, with capture of several frames of a possible infraction event, with pre-event and post-event sequences.

14. A System of claim 1, further comprising a communication module.

15. A system of claim 1, wherein the one or more image capture devices are located at a traffic lane and processing units and storage units are located at a remote location, grouped together at a central facility whereto converge all images of all monitored locations, the one or more image capture devices are interconnected to the central facility using wireless communication, infrared beams, cable or fiber optic communication or satellite communication, and when using physical detectors, the signals from the detectors are also sent to the processing units or the storage units.

16. A system of claim 1, wherein the images captured from a possible offender comprise several frames or pre-event and post-event sequences.

17. A method for monitoring and supervising potential traffic infraction events, comprising the steps of:

- detecting potential traffic infraction events using a single potential traffic infractions detector and one or more image capture devices;
- simultaneously generating, via a single multi-thread capture routine, a distinct thread for each one of a plurality of potential traffic infraction events occurring at least one of almost simultaneously or simultaneously in a same lane or in different lanes of a road, each distinct thread containing a complete record of simultaneously captured images of an associated one of the plurality of potential traffic infraction events;
- creating as many threads as a previously programmed number of frames per second until fulfilling a total time of a pre-event;
- upon creation of a circular buffer of threads, discarding a thread that exceeds the total time and simultaneously creating a new thread to replace the thread having been discarded;
- with each circular memory buffer discarding an oldest frame upon input of each new frame; and in response to an event being triggered, using a thread that is complete, and simultaneously creating a new thread to replace the thread has been used;
- in response to a potential traffic infraction event occurring, not discarding the thread of the pre-event that is complete and performing capture of the post-event in real time; and
- in response to two potential traffic infraction events occurring with a few thousandths of a second of difference between one another, creating backup threads and saving the backup threads frames of pre-events existing in a sole capture thread, wherein each backup thread thereupon saves necessary images in real time for the thread's post-events.

18. A method of claim 17, further comprising the step of capturing the images throughout a long period of time.

19. A method of claim 17, further comprising the step of enabling enlargement of each captured image, in order to allow visualization of details of the images captured by one or more image capture devices.

20. A method of claim 17, further comprising the step of reading out a detector until a vehicle leaves an area of coverage of the detector upon finishing capture of a post-event of a first potential traffic infraction event with several pre-event and post-event frames, and thereupon triggering one further event with pre-event and post-event, irrespective of a time taken by the vehicle to leave the detector, and also irrespective of a traffic signal being at yellow or red light.

21. A method of claim 17, further comprising the step of starting an internal timer in a module, if there is still a presence in the detector with the signal showing a red light or otherwise, and upon a predetermined period of time initiating capture of one further potential traffic infraction event, which may date back to the first potential traffic infraction event, and may have an interval between the first potential traffic infraction event and the further potential traffic infraction event, or may coincide exactly with one another.

22. A method of claim 17, further comprising the step of switching a source of image capture of a vehicle from a front camera to a rear camera, and vice versa, at least using one sole channel.

23. A method of claim 17, further comprising the step of allowing, by dot (pixel) color analysis at a X and Y coordinates of a screen and analysis of color by similarity of a location of a previously acquired image, to determine when a traffic signal is lighted in red, yellow or green color.

24. A method of claim 17, further comprising the step of individually monitoring and supervising each one of contiguous traffic lanes.

25. A method of claim 17, further comprising the step of measuring speed of a vehicle by determining a time taken by the vehicle to travel a distance between two virtual detectors.

26. A method of claim 17, further comprising the step of providing multiple detectors, creating multiple virtual traffic lanes, or providing a system of multiple physical detectors.

27. A method of claim 17, wherein the images captured from a possible offender may comprise several frames or pre-event and post-event sequences.

28. A method of claim 17, further comprising the step of providing one or more vehicle detection devices implemented along a vehicle traffic lane or above the vehicle traffic lane, said one or more vehicle detection devices using microwaves.

29. A method of claim 17, wherein the images of a possible offender are captured from a front and from a rear, with capture of several frames of a possible traffic infraction event, with pre-event and post-event sequences.

30. A System of claim 1, further comprising one or more vehicle detection devices implemented along a vehicle traffic lane or above the vehicle traffic lane, said one or more detection devices being presence sensors using infrared beam technologies.

31. A method of claim 17, further comprising the step of providing one or more vehicle detection devices implemented along a vehicle traffic lane or above the vehicle traffic lane, said one or more vehicle detection devices using infrared beam technologies.

32. A System of claim 2, wherein said long period of time comprises twenty-four hours of the day.

33. A method of claim 18, wherein said long period of time comprises twenty-four hours of the day.

* * * * *